(12) United States Patent
Sato et al.

(10) Patent No.: US 7,621,603 B2
(45) Date of Patent: Nov. 24, 2009

(54) VEHICLE BRAKE CONTROL DEVICE

(75) Inventors: Takashi Sato, Okazaki (JP); Hiroaki Niino, Toyota (JP)

(73) Assignee: ADVICS Co., Ltd., Aichi-pref. (JP)

( * ) Notice: Subject to any disclaimer, the term of this patent is extended or adjusted under 35 U.S.C. 154(b) by 451 days.

(21) Appl. No.: 11/709,092

(22) Filed: Feb. 22, 2007

(65) Prior Publication Data

US 2007/0205658 A1 Sep. 6, 2007

(30) Foreign Application Priority Data

Mar. 6, 2006 (JP) .............................. 2006-059421
Oct. 20, 2006 (JP) .............................. 2006-286614

(51) Int. Cl.
*B60T 13/20* (2006.01)
*B60T 8/42* (2006.01)
*B60T 8/60* (2006.01)

(52) U.S. Cl. .......................... 303/11; 303/146; 303/150; 303/115.5; 303/116.1; 701/80

(58) Field of Classification Search ................... 303/10, 303/11, 20, 113.1, 113.4, 115.1, 115.2, 115.4, 303/115.5, 116.1, 116.2, 150, 155, 156, 157, 303/158, 165, 167, 175; 701/70, 71, 78, 701/80
See application file for complete search history.

(56) References Cited

U.S. PATENT DOCUMENTS

| | | | |
|---|---|---|---|
| 5,487,593 A * | 1/1996 | Potts et al. | 303/11 |
| 5,558,414 A * | 9/1996 | Kubota | 303/10 |
| 6,113,197 A | 9/2000 | Kuroki et al. | |
| 6,234,588 B1 | 5/2001 | Sawada | |
| 7,165,818 B2 * | 1/2007 | Iwasaki et al. | 303/115.5 |

FOREIGN PATENT DOCUMENTS

JP           A-10-203338           8/1998

* cited by examiner

*Primary Examiner*—Thomas J Williams
(74) *Attorney, Agent, or Firm*—Posz Law Group, PLC

(57) ABSTRACT

When the ABS control is executed by the ABS control portion, the vehicle brake control device calculates the first rotational speeds of the first and second motors necessary to achieve the corresponding pressure increase rates and calculates the second rotational speeds of the first and second motors as the upper limits caused by the unlocking pressure limits. Then the vehicle brake control device controls current values of the currents to be supplied to the first and second motors so that they are rotated in the rotational speeds obtained within a range from the first rotational speeds to the second rotational speeds.

7 Claims, 14 Drawing Sheets

|  | NORMAL BRAKING | ABNORMAL BRAKING |
|---|---|---|
| SNO1 | ON (CLOSED) | OFF (OPEN) |
| SNO2 | ON (CLOSED) | OFF (OPEN) |
| SWC1 | ON (OPEN) | OFF (CLOSED) |
| SWC2 | ON (OPEN) | OFF (CLOSED) |
| SLFR | DUTY | OFF (OPEN) |
| SLRL | DUTY | OFF (OPEN) |
| SLFL | DUTY | OFF (OPEN) |
| SLRR | DUTY | OFF (OPEN) |
| SCSS | ON (OPEN) | OFF (CLOSED) |
| FIRST & SECOND MOTOR | ON | OFF |

FIG. 3

VEHICLE BRAKE CONTROL DEVICE

CROSS REFERENCE TO RELATED APPLICATION

This application is based on and incorporates herein by reference Japanese patent applications No. 2006-59421 filed on Mar. 6, 2006 and No. 2006-286614 filed on Oct. 20, 2006.

FIELD OF THE INVENTION

The present invention relates to a vehicle brake control device which generates pressures (hereinafter referred to as W/C pressures) in wheel cylinders (hereinafter referred to as W/Cs) by causing pumps to apply pressures.

BACKGROUND OF THE INVENTION

In Japanese Patent Publication No. H10-203338, a brake-by-wire vehicle brake control device is proposed which has four pumps respectively for the four wheels of a vehicle. Two of the four pumps are located in a common conduit system for two of the four wheels and are driven by a common motor. The other two of the four pumps are located in another common conduit system for the other two of the four wheels and are driven by another common motor.

In the case that the vehicle travels on a cross-border road on which the vehicle experiences different friction coefficients μ at its left and right wheels, brake forces with different strength have to be applied to left and right wheels in an anti lock braking system (hereinafter referred to as ABS) control. More specifically, the vehicle brake control device increases the W/C pressure for a wheel on a high friction section of the cross-border road and decreases the W/C pressure for a wheel on a low friction section of the cross-border road, where the high friction section is a section of the cross-border road having a higher friction coefficient and the low friction section is a section of the cross-border road having a lower friction coefficient.

An ABS control device having an ordinary hydraulic circuit generates the W/C pressures by guiding a brake fluid pressure (hereinafter referred to as an M/C pressure) generated at the master cylinder (hereinafter referred to an M/C) to the W/Cs. The conventional ABS control device also includes pairs of an increase valve and a decrease valve, the pairs installed respectively to the wheels, wherein the increase valves are respectively for increasing the W/C pressures and the decrease valves are respectively for decreasing the W/C pressures. In decreasing the W/C pressure for the wheel on the low friction section, the above conventional ABS control device allows brake fluid to flow into a reservoir to which a low pressure is applied. Therefore, depressurization is executed without interference from increase of the W/C pressure for the wheel on the high friction section.

However, in the case that two pumps are installed to a common conduit system and are driven by a common motor, increase of the W/C pressure at the wheel on the high friction section causes both of the pumps to discharge the brake fluid and accordingly interferes decreasing of the W/C pressure at the wheel on the low friction section. Therefore, the depressurization may become insufficient.

SUMMARY OF THE INVENTION

It is therefore an object of the present invention to provide a brake control device which can properly decrease a W/C pressure at a wheel on the low friction section on a cross-border road, even if increase of the W/C pressure at the wheel on the high friction section causes the corresponding pump to discharge the brake fluid.

In an aspect of the present invention, control means of a vehicle brake control device includes a first calculation portion, a second calculating portion, an ABS control portion, a third calculating portion, a fourth calculating portion, a fifth calculation portion, a sixth calculation portion, and an adjusting portion. The first calculating portion is for calculating target wheel cylinder pressures corresponding to the operation amount detected by the operation amount sensor when the operation amount sensor detects that the brake operating member is operated. The second calculating portion is for calculating slip ratios of the front wheels and the rear wheels. The ABS control portion is for executing an ABS control based on the slip ratios calculated by the second calculating portion. The third calculating portion is for calculating pressure increase rates of the wheel cylinder pressures based on the target wheel cylinder pressures calculated by the first calculating portion. The fourth calculating portion is for estimating friction coefficients of sections of the road on which the front wheels and the rear wheels are located, respectively. The fifth calculation portion is for calculating unlocking pressure limits for the front wheel cylinders and the rear wheel cylinders based on the estimated friction coefficients. The sixth calculation portion is for calculating target rotational speeds of the first and second motors so that the target rotational speed of the first motor is within a range from first one of first rotational speeds to first one of second rotational speeds and the target rotational speed of the second motor is within a range from second one of the first rotational speeds to second one of the second rotational speeds, wherein the first rotational speeds correspond respectively to the pressure increase rates calculated by the third calculating portion and the second rotational speeds correspond respectively to the unlocking pressure limits calculated by the fifth calculation portion. The adjusting portion is for adjusting current values of currents to be supplied to the first and second motors based on the target rotational speeds of the first and second motors calculated by the sixth calculation portion.

As described above, when the ABS control is executed by the ABS control portion, the sixth calculation portion calculates the first rotational speeds of the first and second motors necessary to achieve the corresponding pressure increase rates calculated by the third calculation portion and calculates the second rotational speeds of the first and second motors as the upper limits caused by the unlocking pressure limits calculated by the fifth calculation portion. Then the vehicle brake control device controls current values of the currents to be supplied to the first and second motors so that they are rotated in the rotational speeds obtained as described above.

Therefore, in executing the ABS control on a cross-border road, it is possible to decrease properly the W/C pressure at the wheel on a low friction section of a cross-border road even if increase of the W/C pressure at the wheel on the high friction section of the cross-border road causes the corresponding pump to discharge the brake fluid.

For example, the sixth calculation portion may calculate each of discharge amounts Q1 of brake fluid discharged by the first to fourth pumps by using the following equation:

$$Q1 = k \times \Delta P^{1/2},$$

wherein the value ΔP is one of the unlocking pressure limits for one of the first to fourth pumps corresponding to the discharge amount Q1 and the coefficient k depends on a diameter of a orifice of the pump corresponding to the discharge amount Q1, and may determine the second rotational speeds respectively to be the discharge amounts Q1 divided respectively by amounts of brake fluid discharged by the first to fourth pumps in a 360-degree rotation.

The vehicle brake control device may include a detecting means for detecting a lateral acceleration of a vehicle. In this case, the sixth calculating portion may determine, respectively, the target rotational speed of the first and/or second motor to be equal to the first and/or second one of the second rotational speeds when the detected lateral acceleration is equal to or smaller than a first threshold and to be equal to the first and/or second one of the first rotational speeds when the detected lateral acceleration is equal to or larger than a second threshold which is equal to or larger than the first threshold.

In this case, the vehicle brake control device detects the lateral acceleration of the vehicle, determines stability of the vehicle based on the detected lateral acceleration. The vehicle brake control device then determines the rotational speeds of the first and second motors to be a relatively large value to shorten the brake stopping distance of the vehicle when the degree of the determined stability is high. In addition, the vehicle brake control device determines the rotational speeds of the first and second motors to be a relatively small value to improve the stability of the vehicle when the degree of the determined stability is small.

The vehicle brake control device may include a detecting means for detecting a travel speed of a vehicle. In this case, the sixth calculating portion may determine, respectively, the target rotational speed of the first and/or second motor to be equal to the first and/or second one of the second rotational speeds when the detected travel speed is equal to or smaller than a first threshold and to be equal to the first and/or second one of the first rotational speeds when the detected travel speed is equal to or larger than a second threshold which is equal to or larger than the first threshold. The rotational speeds of the first and second motors can be determined in this way based on the fact that the vehicle becomes more stable as the travel speed of the vehicle becomes smaller.

The vehicle brake control device may include a detecting means for detecting a yaw rate of a vehicle. In this case, the sixth calculating portion may determine, respectively, the rotational speed of the first and/or second motor to be equal to the first and/or second one of the second rotational speeds when the detected yaw rate is equal to or smaller than a first threshold and to be equal to the first and/or second one of the first rotational speeds when the detected yaw rate is equal to or larger than a second threshold which is equal to or larger than the first threshold. The rotational speeds of the first and second motors can be determined in this way based on the fact that the vehicle becomes more stable as the yaw rate of the vehicle becomes smaller.

The vehicle brake control device may include a detecting means for detecting a steering angle of a vehicle. In this case, the sixth calculating portion may determine, respectively, the target rotational speed of the first and/or second motor to be equal to the first and/or second one of the second rotational speeds when the detected steering angle is equal to or smaller than a first threshold and to be equal to the first and/or second one of the first rotational speeds when the detected steering angle is equal to or larger than a second threshold which is equal to or larger than the first threshold. The rotational speeds of the first and second motors can be determined in this way based on the fact that the vehicle becomes more stable as the steering angle of the vehicle becomes smaller.

In another aspect of the present invention, the sixth calculation portion may be for calculating target rotational speeds of the first and second motors so that the target rotational speed of the first motor is within a range from a first bottom rotational speed to a first top rotational speed and the target rotational speed of the second motor is within a range from a second bottom rotational speed to a second top rotational speed, wherein the first bottom rotational speed is a larger one of two rotational speeds corresponding respectively to the calculated pressure increase rates of the first right and first left wheel cylinders, the first top rotational speed is a smaller one of two rotational speeds corresponding respectively to the calculated unlocking pressure limits for the first right and first left wheel cylinders, the second bottom rotational speed is a larger one of two rotational speeds corresponding respectively to the calculated pressure increase rates of the second right and second left wheel cylinders, and the second top rotational speed is a smaller one of two rotational speeds corresponding respectively to the calculated unlocking pressure limits for the second right and second left wheel cylinders.

BRIEF DESCRIPTION OF THE DRAWINGS

The invention, together with additional objective, features and advantages thereof, will be best understood from the following description, the appended claims and the accompanying drawings. In the drawings:

FIG. 3 is a schematic diagram showing operating states of portions in the vehicle brake control device in normal braking and in an abnormal situation;

DETAILED DESCRIPTION OF THE EMBODIMENTS

Figure 1:
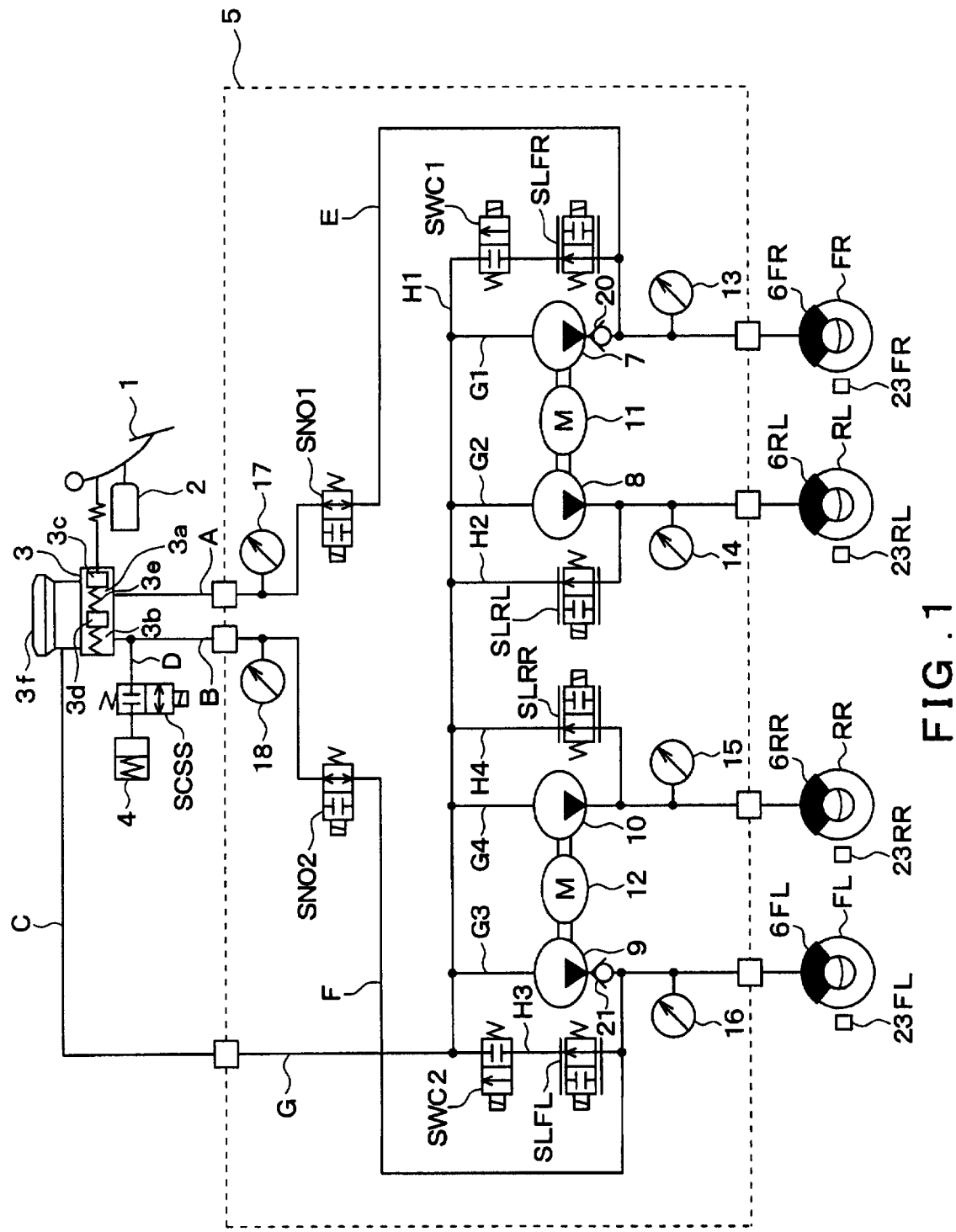
FIG. 1 is a diagram showing a hydraulic circuit configuration of a vehicle brake control device according to a first embodiment of the present invention.

Embodiments of the present invention will be described below with reference to the drawings. In the embodiments below, identical reference symbols are used in the drawings to represent identical or equivalent elements.

First Embodiment

A vehicle brake control device according to a first embodiment of the present invention is applied to a vehicle with an X-shaped hydraulic circuit including two conduit systems, one of which serves the right front wheel and the left rear wheel and the other of which serves the left front wheel and the right rear wheel.

Figure 2:
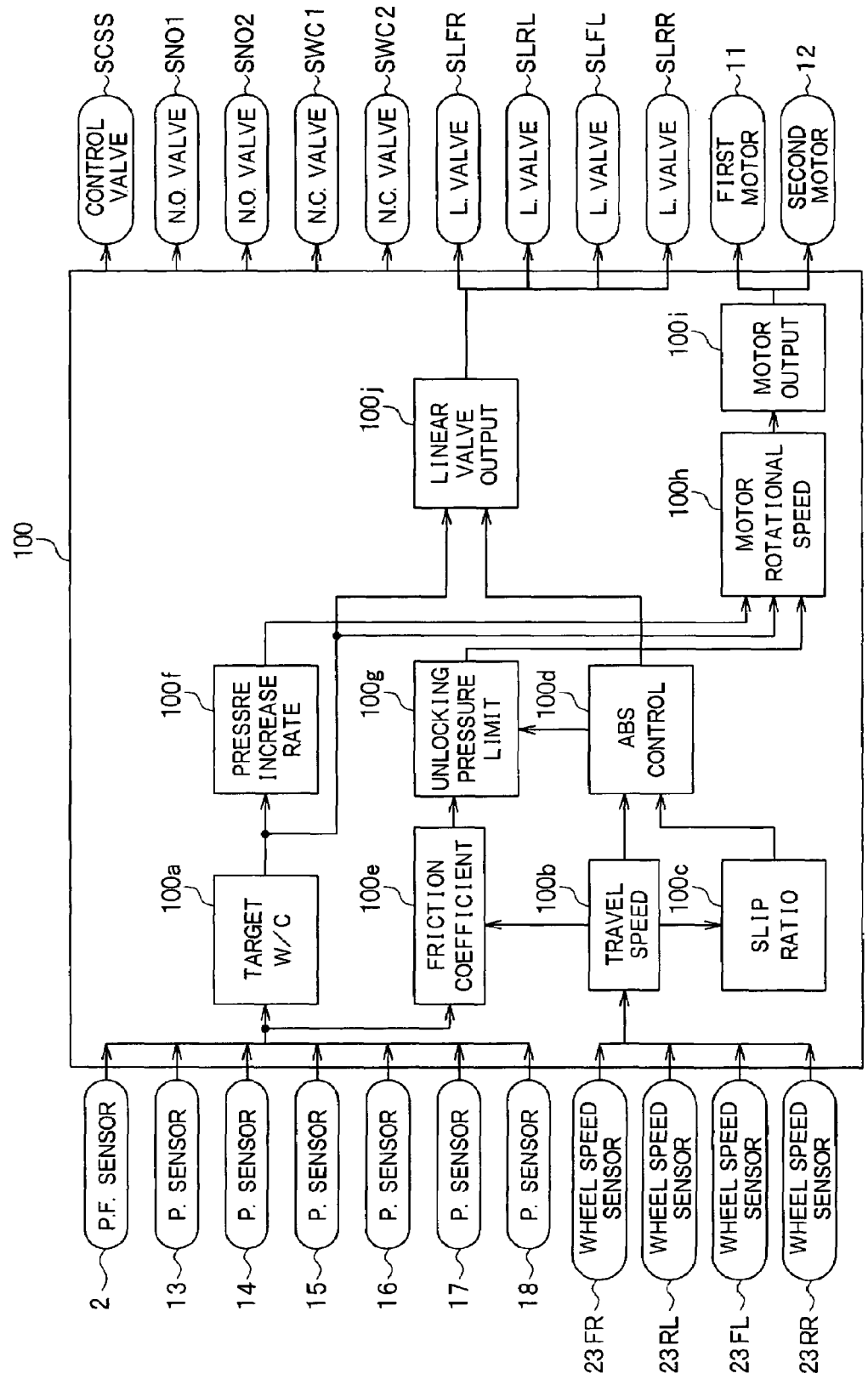
FIG. 2 is a block diagram showing input-output relationships of signals of a brake ECU that controls a control system of the vehicle brake control device shown in FIG. 1.

As shown in FIG. 1, the vehicle brake control device includes a brake pedal 1, a depression force sensor 2, a master cylinder (hereinafter referred to as an M/C) 3, a stroke control valve SCSS, a stroke simulator 4, a brake fluid pressure control actuator 5, and wheel cylinders (hereinafter referred to as W/Cs) 6FL, 6FR, 6RL, 6RR, as well as a brake ECU 100 shown in FIG. 2.

When the brake pedal 1, which is an example of a brake operating member, is depressed by a driver, the depression force applied to the brake pedal 1 is inputted to the depression force sensor 2, and a detection signal corresponding to the applied depression force is outputted by the depression force sensor 2. The detection signal is inputted to the brake ECU 100, and thus the depression force applied to the brake pedal 1 is detected by the brake ECU 100. Although the depression force sensor 2 is used as an example of an operation amount sensor for detecting an amount of operation to the brake operating member, a stroke sensor or the like may also be used as another example of the operation amount sensor. The vehicle brake control device may also be configured such that it detects a state of operation of the brake pedal 1 based on detection signals from a stroke sensor and pressure sensors 17 and 18, which detect an M/C pressure described later.

A push rod or the like is connected with the brake pedal 1 and transmits the applied depression force to the M/C 3. When the push rod or the like is pushed, the M/C pressure is generated in a primary chamber 3a and a secondary chamber 3b, which are provided in the M/C 3.

The M/C 3 includes a primary piston 3c and a secondary piston 3d, which form and demarcates the primary chamber 3a and the secondary chamber 3b. The primary piston 3c and the secondary piston 3d receive an elastic force of a spring 3e, thereby return the brake pedal 1 to its initial position when the brake pedal 1 becomes free from the depression force.

The vehicle brake control device also includes brake conduits A and B, which extend respectively from the primary chamber 3a and the secondary chamber 3b of the M/C 3 to the brake fluid pressure control actuator 5.

The M/C 3 also includes a master reservoir 3f. While the brake pedal 1 is in its initial position, the master reservoir 3f is connected with the primary chamber 3a and the secondary chamber 3b via channels not shown in FIG. 1, supplies brake fluid to the M/C 3, and stores any surplus brake fluid.

A brake conduit C directly extends from the master reservoir 3f to the brake fluid pressure control actuator 5.

The stroke simulator 4 is connected with a brake conduit D extending from the brake conduit B and receives the brake fluid in the secondary chamber 3b. The stroke control valve SCSS, a type of normally-closed two-position valve, is provided in the brake conduit D and controls open and closed states of the brake conduit D. A normally closed two-position valve opens a path to which it is installed while electrical power is supplied to it, and closes the path while electrical power is not supplied to it. The configuration allows the stroke control valve SCSS to control the flow of brake fluid to the stroke simulator 4.

The brake fluid pressure control actuator 5 is configured as described below.

The actuator 5 includes a brake conduit E which is connected with the brake conduit A so that the primary chamber 3a is connected via the brake conduit E with the W/C (first front wheel W/C) 6FR, which corresponds to a front wheel FR. A first normally-open valve (a first control valve) SNO1 is located in the brake conduit E. The first normally-open valve SNO1 is a two-position valve that opens a path to which it is installed while electrical power is not supplied to it, and closes the path while electrical power is supplied to it. The first normally-open valve SNO1 controls the open and closed states of the brake conduit E.

The actuator 5 also includes a brake conduit F which is connected with the brake conduit B so that the secondary chamber 3b is connected via the brake conduit F with the W/C (second front wheel W/C) 6FL, which corresponds to a front wheel FL. A second normally-open valve (a second control valve) SNO2 is located in the brake conduit F. The second normally-open valve SNO2 is a two-position valve that opens a path to which it is installed while electrical power is not supplied to it, and closes the path while electrical power is supplied to it. The second normally-open valve SNO2 thus controls the open and closed states of the brake conduit F.

The actuator also includes a brake conduit G which is connected with the brake conduit C that extends from the master reservoir 3f. The brake conduit G branches into four brake conduits called brake conduits G1, G2, G3, and G4 which are respectively connected with the W/Cs 6FR, 6RL, 6FL, and 6RR, wherein the W/Cs 6FL and 6FR respectively correspond to the front wheels FL and FR, and the W/Cs (first and second rear wheel W/Cs) 6RL and 6RR respectively correspond to the rear wheels RL and RR. Note that the brake conduit G includes the brake conduits G1 to G4.

The brake conduits G1 to G4 are respectively provided with pumps (first to fourth pumps) 7, 8, 9, 10. The pumps 7 to 10 are configured as, for example, trochoid pumps which are effective for quietness. The pumps 7 and 8 are driven by a first motor 11, and the pumps 9 and 10 are driven by a second motor 12. Each of the first motor 11 and the second motor 12 may be of any kind of motor, but a brushless motor is preferable because it increases its rotational speed quickly after it starts rotating.

Brake conduits H1, H2, H3, and H4 are located in parallel with the pumps 7 to 10, respectively.

A first normally-closed valve SWC1 and a first linear valve SLFR are located in series in the brake conduit H1 connected in parallel with the pump 7. The first normally-closed valve SWC1 is located closer than the linear valve SLFR is to the intake side (upstream side) of the pump 7, and the first linear valve SLFR is located closer than the first normally-closed valve SWC1 is to the discharge side (downstream side) of the pump 7. In other words, a return flow returning through the brake conduit H1 to the master reservoir 3f can be controlled by using the first normally-closed valve SWC1.

A second linear valve SLRL is located in the brake conduit H2 connected in parallel with the pump 8.

A second normally-closed valve SWC2 and a third linear valve SLFL are located in series in the brake conduit H3 connected in parallel with the pump 9. The second normally-closed valve SWC2 is located closer than the third linear valve SLFL is to the intake side (upstream side) of the pump 9, and the third linear valve SLFL is located closer than the second normally-closed valve SWC2 is to the discharge side (downstream side) of the pump 9. In other words, a return flow returning through the brake conduit H3 to the master reservoir 3f can be controlled by using the second normally-closed valve SWC2.

A fourth linear valve SLRR is located in the brake conduit H4 connected in parallel with the pump 10.

A first pressure sensor 13, a second pressure sensor 14, a third pressure sensor 16, and a fourth pressure sensor 15 are respectively located in the brake conduits G1 to G4, between the pumps 7 to 10 and the W/Cs 6FR to 6RR, and are configured in such a way that the pressures in each of the W/Cs can be detected. The pressure sensors 17 and 18 are respectively located in the brake conduits E and F on the upstream sides (the M/C 3 sides) of the first and second normally-open valves SNO1, SNO2, and are configured in such a way that an M/C pressure that is generated in the primary chamber 3a and the secondary chamber 3b of the M/C 3 can be detected. The detection signals from the pressure sensors 13 to 18 are inputted to the brake ECU 100, as shown in FIG. 2.

Check valves 20 and 21 are respectively located in the discharge port of the pump 7 which pressurizes the W/C 6FR, and in the discharge port of the pump 9 which pressurizes the W/C 6FL. The check valves 20 and 21 are provided to prevent brake fluid from flowing respectively from the W/Cs 6FR and 6FL to the pumps 7 and 9.

In the vehicle brake control device, a first conduit system includes a hydraulic circuit (a first auxiliary brake conduit) that connects the primary chamber 3a with the W/C 6FR via the brake conduit A and the brake conduit E. The first conduit system also includes a hydraulic circuit (a first main brake conduit) that connects the master reservoir 3f and the W/Cs 6FR and 6RL via the brake conduits C, G, G1, and G2. The first conduit system further includes hydraulic circuits (first and second pressure-adjusting brake conduits) having the brake conduits H1 and H2, which are connected in parallel with the pumps 7 and 8, respectively.

Also in the vehicle brake control device, a second conduit system includes a hydraulic circuit (a second auxiliary brake conduit) that connects the secondary chamber 3b and the W/C 6FL via the brake conduit B and the brake conduit F. The second conduit system also includes a hydraulic circuit (a second main brake conduit) that connects the master reservoir 3f and the W/Cs 6FL and 6RR via the brake conduits C, G, G3, and G4. The second conduit system further includes hydraulic circuits (third and fourth pressure-adjusting brake conduits) having the brake conduits H3 and H4, which are connected in parallel with the pumps 9 and 10, respectively.

The vehicle brake control system also includes wheel speed sensors 23FR, 23RL, 23FL, and 23RR respectively for detecting wheel speeds of the wheels FR, RL, FL, and RR. A wheel speed of a wheel is the product of a rotational speed of the wheel and a circumference of the wheel. Detection signals from the wheel speed sensors 23FR to 23RR are inputted into the brake ECU 100.

The brake ECU 100 includes a well-known microcomputer which has a CPU, a ROM, a RAM, and an I/O. The brake ECU 100 executes, according to programs stored in the ROM and the like, several kinds of brake control processes including a process for emergency braking such as an ABS control process. The brake ECU 100 includes semiconductor switching elements (not shown) for controlling ON/OFF states of power supply lines for the control valves SCSS, SNO1, SNO2, SWC1, SWC2, SLFR, SLRL, SLFL, SLRR, the first motor 11, and the second motor 12. ON/OFF of the power supply to the valves and the motors and an average of current values for the valves and the motors can be controlled by, for example, using the ON/OFF control of the semiconductor switching elements.

More specifically, the brake ECU 100 includes a target W/C pressure calculating portion 100a, a travel speed calculating portion 100b, a slip ratio calculating portion 100c, an ABS controlling portion 100d, a friction coefficient estimating portion 100e, a pressure increase rate calculating portion 100f, an unlocking hydraulic pressure limit calculating portion (hereinafter referred to as an unlocking limit calculating portion) 100g, a motor rotational speed calculating portion 100h, a motor output adjusting portion 100i, a linear valve output adjusting portion 100j, and the like.

The target W/C pressure calculating portion 100a calculates target W/C pressures respectively for the four wheels. The target W/C pressures are pressures required to generate a target brake force. More specifically, the portion 100a calculates, based on the detection signal from the depression force sensor 2, a physical quantity of a depression force corresponding to the amount of the operation to the brake pedal 1. The amount of the operation to the brake pedal 1 will be referred to as a pedaling amount. Then the portion 100a calculates the target W/C pressures corresponding to the physical quantity. The target W/C pressures are proportional to the pedaling amount and is determined based on a mapping dataset or a formula which indicates a relation between the pedaling amount and values for a target W/C pressure. The mapping dataset may be stored in a storage device.

The travel speed calculating portion 100b calculates the wheel speeds and wheel accelerations of the wheels FR to RR based on the detection signals from the wheel speed sensors 23FR to 23RR. The wheel accelerations can be determined as time derivatives of the wheel speeds. The portion 100b then calculates a speed of the body of the vehicle based on the calculated wheel speeds. The speed of the body of the vehicle will be referred to as a body speed. Methods for calculating the body speed is not described in detail because it is known well.

The slip ratio calculating portion 100c calculates slip ratios of the wheels FR to RR. A slip ratio of a wheel is calculated as a deviation of the wheel speed of the wheel from the calculated body speed. More specifically, each of the slip ratios is calculated as a speed difference divided by the body speed, where the speed difference is a difference of a corresponding wheel speed from the body speed.

The ABS controlling portion 100d determines a time to start decreasing each of W/C pressures at the W/Cs 6FL to 6RR based on the result of comparison between a reference slip ratio and each of the slip ratios calculated by the slip ratio calculating portion 100c. The ABS controlling portion 100d also determines a time to increase or maintain each of W/C pressures at the W/Cs 6FL to 6RR based on whether each of the wheel speeds is catching up with the body speed, that is, whether each of the wheel accelerations has a positive value. The ABS controlling portion 100d also executes the ABS control process in a conventional manner, and a detailed description of the ABS control process is omitted.

The friction coefficient estimating portion 100e is for estimating friction coefficients μ of sections of a road on each of which one of the wheels FR to RR is moving. For example, the portion 100e estimates each of the friction coefficients μ based on a change of a W/C pressure at a corresponding W/C detected by a corresponding pressure sensor and on a change of a wheel speed of a corresponding wheel calculated by the travel speed calculating portion 100b. The friction coefficient estimating portion 100e can use any of various known methods for estimating the friction coefficients μ.

The pressure increase rate calculating portion 100f calculates pressure increase rates of the W/Cs 6FR to 6RR. Each of the pressure increase rates is an increase rate (i.e. an increase amount per unit time) of a W/C pressure at a corresponding W/C. For example, the pressure increase rates can be calculated based on change rates of the target W/C pressures calculated by the portion 100a.

The unlocking limit calculating portion 100g calculates unlocking pressure limits respectively for the W/Cs 6FR, 6RL, 6FL, and 6RR based on the friction coefficients μ respectively for the wheels FR, RL, FL, and RR estimated by the friction coefficient estimating portion 100e. An unlocking pressure limit, which depends on a friction coefficient μ of a road, is a W/C pressure above which the ABS control process does not work properly and a wheel on the road accordingly locks. The unlocking pressure limits decrease as the friction coefficients μ become smaller and are calculated based on a predetermined characteristic of the vehicle brake control device.

The motor rotational speed calculating portion 100h calculates rotational speeds (hereinafter referred to as target rotational speeds) required to the first and second motors 11 and 12. More specifically, the portion 100h determines the target rotational speeds so that they meet restrictions due to the pressure increase rates calculated by the pressure increase rate calculating portion 100f and due to the unlocking pressure limits calculated by the unlocking limit calculating portion 100g.

The motor output adjusting portion 100i controls, based on the result of the calculation of the motor rotational speed calculating portion 100h, currents supplied to the first and second motors 11 and 12. For example the portion 100i controls ON/OFF of the semiconductor switching elements in order to adjust average current values of the currents over an interval. With the control of the portion 100i, the first and second motors 11 and 12 achieve the target rotational speeds calculated by the motor rotational speed calculating portion 100h.

The linear valve output adjusting portion 100j calculates, based on the target W/C pressures or on the result of the operation of the ABS controlling portion 100d, current values for currents to be supplied to the linear valves SLFR to SLRR. The portion 100j then adjusts the currents to the linear valves SLFR to SLRR based on the calculated current values. For example, the portion 100j determines an average of each of the current values in an interval by determining duty factors related to ON/OFF of the currents to the SLFR to SLRR. The portion 100j may control the averages of the current values by controlling ON/OFF of the semiconductor switching elements located in power supply lines to the first to fourth linear valves SLFR to SLRR, so that differential pressures generated at the first to fourth linear valves SLFR to SLRR have values suitable for the calculated target W/C pressures. Each of the differential pressures is a difference in the brake fluid pressure between both ends of its corresponding valve.

The brake ECU 100 also generates the W/C pressures at the W/Cs 6FR to 6RR by outputting control signals (more specifically, control currents) for driving the control valves SCSS, SNO1, SNO2, SWC1, and SWC2, in addition to controlling the currents to the first and second motors 11 and 12 by means of the motor output adjusting portion 100i and controlling the currents to the first to fourth linear valves SLFR to SLRR by means of the linear valve output adjusting portion 100j. The brake ECU 100 also detects the generated W/C pressures and the M/C pressure based on the detection signals from the sensors 13 to 18 and accordingly loops back an actual brake force generated at the wheels to a control for achieving a target brake force.

The signals for driving the brake ECU 100, the control valves SCSS, SNO1, SNO2, SWC1, SWC2, SLFR, SLRL, SLFL, SLRR, the first motor 11, and the second motor 12 are supported by power supply from a on-board battery (not shown).

The operation of the brake control device during normal braking, in the ABS control process, and in an abnormal situation will be described below separately.

FIG. 3 is a table showing the operating states of portions of the vehicle brake control device during the normal braking and in the abnormal situation. The brake ECU 100 determines, by executing a conventional initial check or the like, whether or not the abnormal situation has arose. If the abnormal situation arises, abnormal-state braking operation is executed until the abnormal situation goes away. Hereinafter, the operation during the normal braking, in ABS operation, and in the abnormal situation will be described with reference to FIG. 3.

(1) Operation During the Normal Braking

During normal braking, when the brake pedal 1 is depressed and the detection signal from the brake operation amount sensor 2 is inputted to the brake ECU 100, the brake ECU 100 operates the various control valves SCSS, SNO1, SNO2, SWC1, SWC2, SLFR, SLRL, SLFL, SLRR, and the first and second motors 11, 12 such that they are in the operating states shown in FIG. 3.

Electric power to both the first and second normally-open valves SNO1 and SNO2 is turned to ON, and electric power to both the first and second normally-closed valves SWC1 and SWC2 is turned to ON. Therefore, the first and second normally-open valves SNO1 and SNO2 are both put into a closed state, and the first and second normally-closed valves SWC1 and SWC2 are both put into an open state.

The ON/OFF switching of electric power to the first to fourth linear valves SLFR, SLRL, SLFL, SLRR is subject to duty control (or PWM control) under which the amount of electric power supplied per unit time to the linear valves is controlled in such a way that the pressure differences between the upstream and downstream sides of the linear valves are controlled linearly. Electric power to the stroke control valve SCSS is turned to ON, causing the stroke simulator 4 to be connected with the secondary chamber 3b through the brake conduits B and D. In this case, the brake fluid in the secondary chamber 3b moves to the stroke simulator 4 when the brake pedal is depressed and the pistons 3c and 3d move. Therefore, when the driver depresses the pedal 1, a reaction force corresponding to an amount of the depression is generated. The brake pedal 1 can hence be depressed without making the driver feel that depressing the brake pedal 1 becomes like pressing a hard board (i.e. giving a board feeling) as a result of the increase in the master cylinder pressure.

In addition, power supply to the first and second motors 11 and 12 is turned to ON and the pumps 7 to 10 draws in and discharges the brake fluid. In this manner, the brake fluid is supplied to the W/Cs 6FR to 6RR when the pumps 7 to 10 perform pumping operation.

Since the first and second normally-open valves SNO1 and SNO2 are in a closed state at this time, the brake fluid pressures downstream of the pumps 7 to 10, that is, the W/C pressures of the W/Cs 6FR to 6RR, are increased. Since the first and second normally-closed valves SWC1 and SWC2 are in an open state and the average amount of electric energy supplied per unit time to the first to fourth linear valves SLFR, SLRL, SLFL, and SLRR are subject to duty control, the W/C pressures of the W/Cs 6FR to 6RR are adjusted according to duty factors of the current value for the linear valves SLFR, SLRL, SLFL, and SLRR.

The brake ECU 100 monitors the W/C pressures in the W/Cs 6FR to 6RR based on the detection signals from the pressure sensors 13 to 16. The brake ECU 100 accordingly adjusts the W/C pressures to desired values by adjusting the amounts of electric power supplied to the first and second motors 11 and 12 to control the revolution speeds thereof and by controlling the ON/OFF duty ratios for the electric power that is supplied to the first to fourth linear valves SLFR, SLRL, SLFL, and SLRR.

Thus, braking force is generated according to the amount of operation performed to the brake pedal 1.

(2) Operation in the ABS Control Process

When the ABS controlling portion 100$d$ determines to start the ABS control process, it determines operation modes respectively for the W/Cs 6FR, 6RL, 6FL, and 6RR. Each of the operation modes is selected from modes for increasing, maintaining, and increasing decreasing a corresponding W/C pressure. The control valves are driven according to the determined operation modes. At this time, the control valves operate basically in the manner shown in FIG. 3. The motor output adjusting portion 100$i$ and the linear valve output adjusting portion 100$j$ accordingly adjust current values of the currents to the first motor 11, the second motor 12, and first to fourth linear valves SLFR, SLRL, SLFL, SLRR in order to increase, maintain, and decrease the W/C pressures.

For example, in decreasing the W/C pressure of the W/C corresponding to a wheel under control of the ABS control process, the current value of the current to be supplied to corresponding one of first to fourth linear valves SLFR, SLRL, SLFL, SLRR is decreased so that the differential pressure at the corresponding linear valve has a value smaller than that before decreasing the W/C pressure. In maintaining the W/C pressure of the W/C corresponding to the wheel under control of the ABS control process, the current value of the current to be supplied to the corresponding linear valve is maintained (for example, kept constant) so that the differential pressure at the corresponding linear valve is maintained (for example, kept constant). In increasing the W/C pressure of the W/C corresponding to a wheel under control of the ABS control process, the current value of the current to be supplied to the corresponding linear valve is increased so that the differential pressure at the corresponding linear valve has a value larger than that before increasing the W/C pressure.

Thus, the current values to the first to fourth linear valves SLFR to SLRR are adjusted so that the ABS control process works properly.

In the ABS control process, the vehicle brake control device of the present embodiment controls the rotational speed of the first and second motors 11 and 12 in a method. Hereinafter, the method for controlling the rotational speed of the first and second motors 11 and 12 will be described in the case that the ABS process operates while the vehicle having the vehicle brake control device is traveling on a cross-border road.

When the vehicle is on a cross-border road, the vehicle experiences different friction coefficients μ at its left and right wheels. It is therefore necessary to generate different brake forces at the left and right wheels. More specifically, it is necessary to increase a W/C pressure corresponding to a wheel on a high friction section of the cross border road and decrease a W/C pressure corresponding to a wheel on a low friction section of the cross border road having a lower friction coefficient μ. The high friction section is a section having a higher friction coefficient μ and the low friction section is a section having a lower friction coefficient μ.

In increasing the W/C pressure corresponding to a wheel on the high friction section, it is necessary to determine a target rotational speed of a motor corresponding to the wheel so that the rotational speed becomes sufficient to achieve a required increase rate of the W/C pressure. In decreasing the W/C pressure corresponding to a wheel on the low friction section, the unlocking pressure limit restricts a target rotational speed of a motor corresponding to the wheel.

Therefore, it is necessary to determine the target rotational speeds of the motors 11 and 12 which meet the two requirements.

The pressure increase rate calculating portion 100$f$ calculates required increase rates of the W/C pressures by calculating change rates of the target W/C pressures calculated by the target W/C pressure calculating portion 100$a$. Then, as described later, two rotational speeds (hereinafter referred to first rotational speeds) respectively of the motors 11 and 12 which are necessary to achieve the required pressure increase rates can be determined based on, for example, a relation between a rotational speed and an increase rate shown in FIG. 4A.

The unlocking pressure limit changes, as described above, depending on the friction coefficient μ of a road. As described above, the unlocking limit calculating portion 100$g$ calculates the unlocking pressure limits by using the friction coefficients μ estimated by the friction coefficient estimating portion 100$e$.

Figure 5:
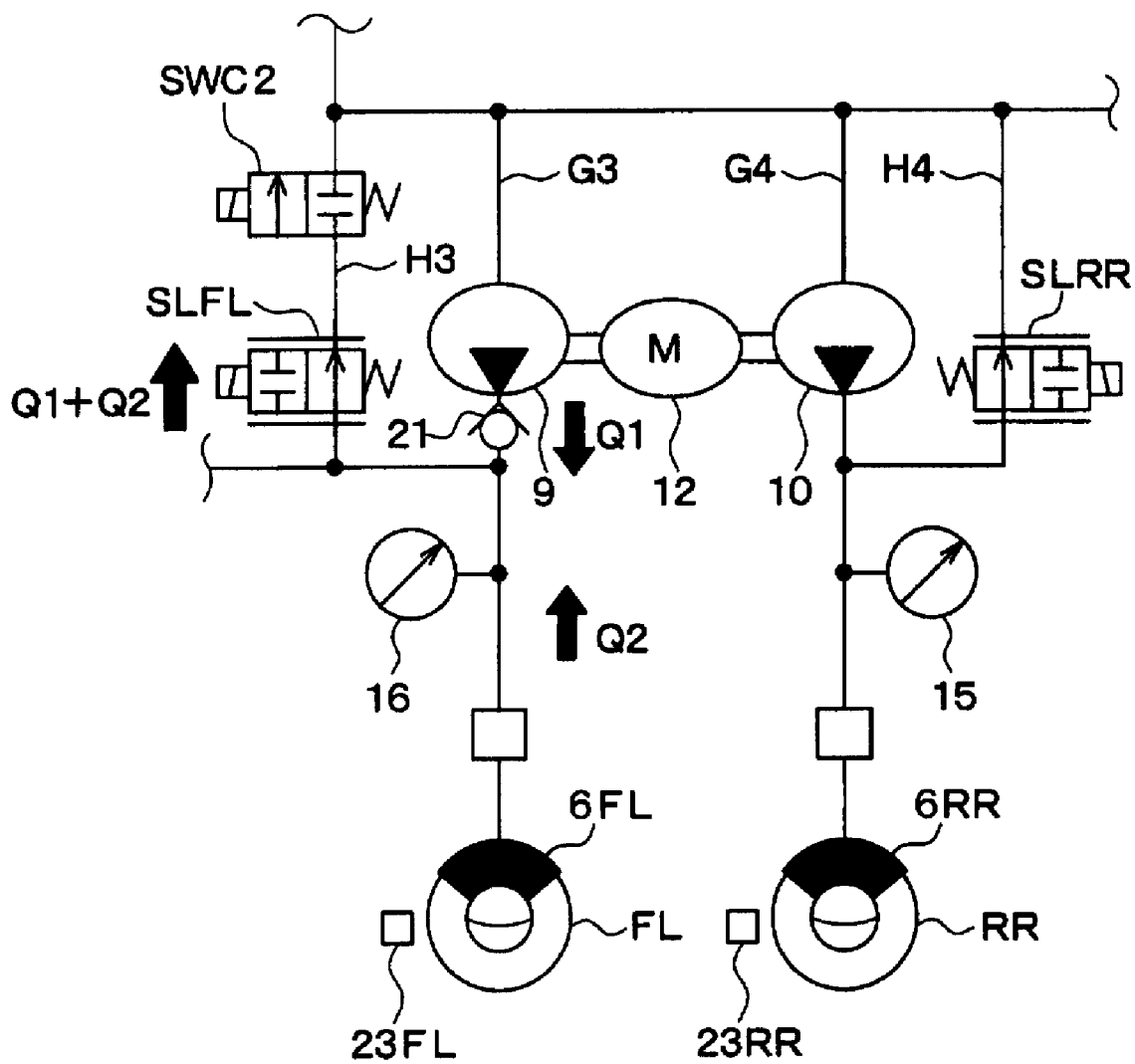
FIG. 5 is a magnified view of the second conduit system shown in FIG. 1.

Hereinafter, a case will be described in which a W/C pressure falls down to an unlocking pressure limit. In FIG. 5, a portion of the second conduit system is magnified and arrows indicating respectively a discharge amount Q1 of brake fluid discharged by the pump 9, a flow amount Q2 of brake fluid flowing from the W/C 6FL to the third linear valve SLFL, and a total flow amount Q1+Q2 of brake fluid flowing through the third liner valve SLFL.

The total flow amount Q1+Q2 through the third liner valve SLFL is expressed as follows:

$$Q1+Q2=k \times \Delta P^{1/2}, \quad (2)$$

where the ΔP is the differential pressure generated at the third linear valve SLFL, and the coefficient k depends on the viscosity of the brake fluid and on a radius of the orifice of the third linear valve SLFL. The amount of flow of the brake fluid moving from the W/C 6FL to the third linear valve SLFL is zero when the W/C pressure at the W/C 6FL is as low as the unlocking pressure limit for the W/C 6FL, because all brake fluid which can flow out from the W/C 6FL completes its movement before the W/C pressure at the W/C 6FL becomes as low as the unlocking pressure limit for the W/C 6FL. In this case, the discharge amount Q1 from the third pump 9 is equal to the total flow amount Q1+Q2. Therefore, the above equation (2) is equivalent to $$Q1=k \times \Delta P^{1/2}. \quad (3)$$

The differential pressure ΔP at the W/C 6FL is equal to the W/C pressure of the W/C 6FL, that is, equal to the unlocking pressure limit for the W/C 6FL. Therefore, the discharge amount Q1 is determined by substituting the unlocking pressure limit for the W/C 6FL to the quantity ΔP of equation (3).

The unlocking pressure limit for the W/C 6FL is determined based on the friction coefficient z for the front left wheel 6FL estimated by the friction coefficient estimating portion 100$e$. The required rotational speed of the second motor 12 is determined to be the discharge amount Q1 from the third pump 9 divided by an amount of brake fluid discharged by the third pump 9 through a 360 degree rotation of the second motor 12. Thus, a second rotational speed corresponding to the unlocking pressure limit of the W/C 6FL is determined as a candidate of an upper limit of the target rotational speed of the second motor 12. In the same manner, another second rotational speed corresponding to the unlocking pressure limit for the W/C 6RR is determined as another candidate of the upper limit of the target rotational speed of the second motor 12. Still in the same manner, the other second rotational speeds corresponding respectively to the unlocking pressure limit for the W/Cs 6FR and 6RL are determined as candidates of an upper limit of the target rotational speed of the first motor 11.

Figure 4:
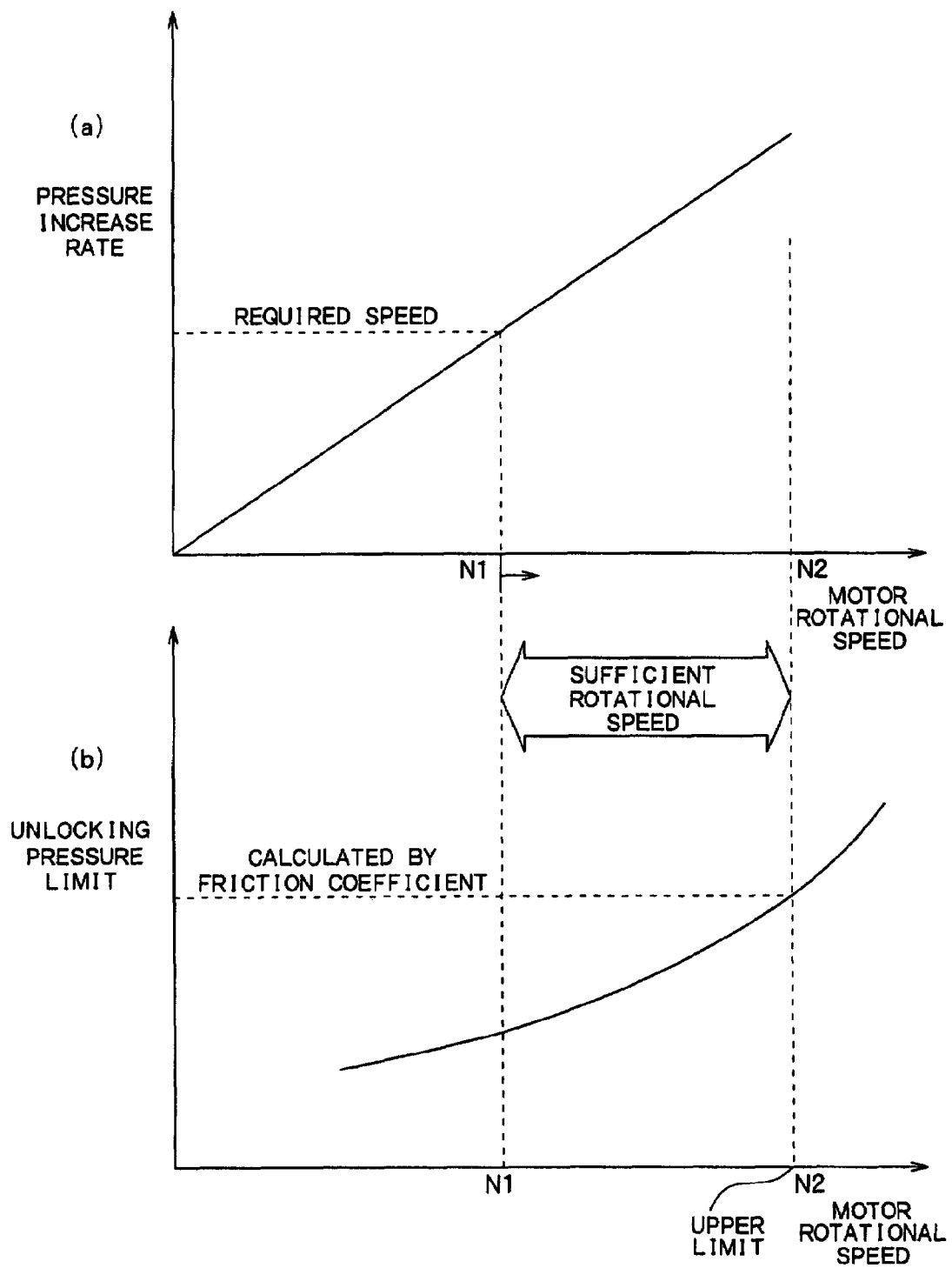
FIG. 4 is two graphs one of which shows a relation between a rotational speed of a motor and a pressure increase rate and the other of which a relation between a rotational speed of a motor and an unlocking pressure limit.

Each of the determined second rotational speeds has dependency on a corresponding unlocking pressure limit as described in FIG. 4(b). Therefore, the second rotational speeds may be determined by using a mapping dataset indicating the dependency shown in FIG. 4(b).

The motor rotational speed calculating portion 100h calculates, in the manner described above, the first rotational speeds of the motors 11 and 12 required to support the pressure increase rates. Then the portion 100h selects a first one and a second one of the first rotational speeds. Hereinafter, the first one of the first rotational speeds is referred to as a first bottom rotational speed, and the second one of the first rotational speeds is referred to as a second bottom rotational speed. The first bottom rotational speed is for the motor 11 and is the larger one of the first rotational speeds for the front right W/C 6FR and the rear left W/C 6RL. The second bottom rotational speed is for the motor 12 and is the larger one of the first rotational speeds for the front left W/C 6FL and the rear right W/C 6RR. Therefore, the first bottom rotational speed and the second bottom rotational speed are rotational speeds required at the high friction section of the road.

The portion 100h also calculates, in the manner described above, the second rotational speeds of the motors 11 and 12 as candidates for upper limits caused by the unlocking pressure limits at the low friction section of the road. Then the portion 100h selects a first one and a second one of the second rotational speeds. Hereinafter, the first one of the second rotational speeds is referred to as a first top rotational speed, and the second one of the second rotational speeds is referred to as a second top rotational speed. The first top rotational speed is for the motor 11 and is the smaller one of the second rotational speeds for the front right W/C 6FR and the rear left W/C 6RL. The second top rotational speed is for the motor 12 and is the smaller one of the second rotational speeds for the front left W/C 6FL and the rear right W/C 6RR.

Then the portion 100h determines the target rotational speeds of the motor 11 to be between the first bottom rotational speed and the first top rotational speed. The portion 100h also determines the target rotational speeds of the motor 12 to be between the second bottom rotational speed and the second top rotational speed. The motor output adjusting portion 100i then calculates the current values for the first and second motors 11 and 12 based on the target rotational speeds determined by the motor rotational speed calculating portion 100h. As a consequence, the currents with the calculated current values are supplied to the first and second motors 11 and 12.

Therefore, in executing the ABS control on a cross-border road, the brake ECU 100 can properly decrease the W/C pressure at the wheel on the low friction section even if increase of the W/C pressure at the wheel on the high friction section causes the corresponding pump to discharge the brake fluid.

(3) Abnormal-State Braking Operation

When an abnormal situation arises in the vehicle brake control device, there is a possibility that control signals cannot be outputted from the brake ECU 100, or that some of the control valves SCSS, SNO1, SNO2, SWC1, SWC2, SLFR, SLRL, SLFL, SLRR or the first and second motors 11, 12 do not work properly. In this case, electric power to the various control valves SCSS, SNO1, SNO2, SWC1, SWC2, SLFR, SLRL, SLFL, SLRR and the first and second motors 11, 12 is turned to OFF as shown in FIG. 3.

Since the electric power to both the first and second normally-open valves SNO1 and SNO2 is turned to OFF, both valves SNO1 and SNO2 are in the open states. Since the electric power to both the first and second normally-closed valves SWC1 and SWC2 is turned to OFF, both valves SWC1 and SWC2 are in the closed states.

Since the electric power to all of the first to fourth linear valves SLFR, SLRL, SLFL, and SLRR is turned to OFF, they are in the open states. Since electric power to the stroke control valve SCSS is also turned to OFF, the stroke simulator 4 and the secondary chamber 3b are cut off from each other.

Since the electric power to the first and second motors 11 and 12 is turned to OFF, the pumps 7 to 10 stop drawing in and discharging the brake fluid.

At this time, the primary chamber 3a of the M/C 3 is in a state in which it is connected with the W/C 6FR in the right front wheel FR via the brake conduits A, E, and G1, and the secondary chamber 3b is in a state in which it is connected with the W/C 6FL in the left front wheel FL via the brake conduits B, F, and G3.

Therefore, if the brake pedal 1 is depressed and the push rod or the like is pushed according to the applied depression force, the M/C pressure is generated in the primary chamber 3a and the secondary chamber 3b and the M/C pressure is transmitted to the W/Cs 6FR and 6FL. Braking force is thereby generated for both front wheels FR and FL.

In the abnormal-state braking operation described above, the W/C pressures in the W/Cs 6FR and 6FL on the front wheels also takes effect in the brake conduits G1 and G3. However, the check valves 20 and 21 prevent the W/C pressures from bearing on the pumps 7 and 9 and thereby prevent the brake fluid leaking through the pumps 7 and 9. The W/C pressures therefore are not decreased because of leaking of the brake fluid.

As described above, in the ABS control, the vehicle brake control device according to the present embodiment calculates the first and second bottom rotational speeds respectively of the motors 11 and 12 necessary to achieve the pressure increase rate required on the high friction sections and calculates the first and second top rotational speeds respectively of the motors 11 and 12 as the upper limits caused by the unlocking pressure limits. Then the vehicle brake control device controls current values of the currents to be supplied to the first and second motors 11 and 12 so that they are rotated in the rotational speeds obtained as described above.

Therefore, in executing the ABS control on a cross-border road, the brake ECU 100 can properly decrease the W/C pressure at the wheel on the low friction section even if increase of the W/C pressure at the wheel on the high friction section causes the corresponding pump to discharge the brake fluid.

Second Embodiment

A second embodiment of the present invention will be described. In this embodiment, a portion of the configuration of the vehicle brake control device is different from the configuration in the first embodiment, but the overall configuration is basically the same as that in the first embodiment, so only the parts which are different from the first embodiment will be described.

Figure 6:
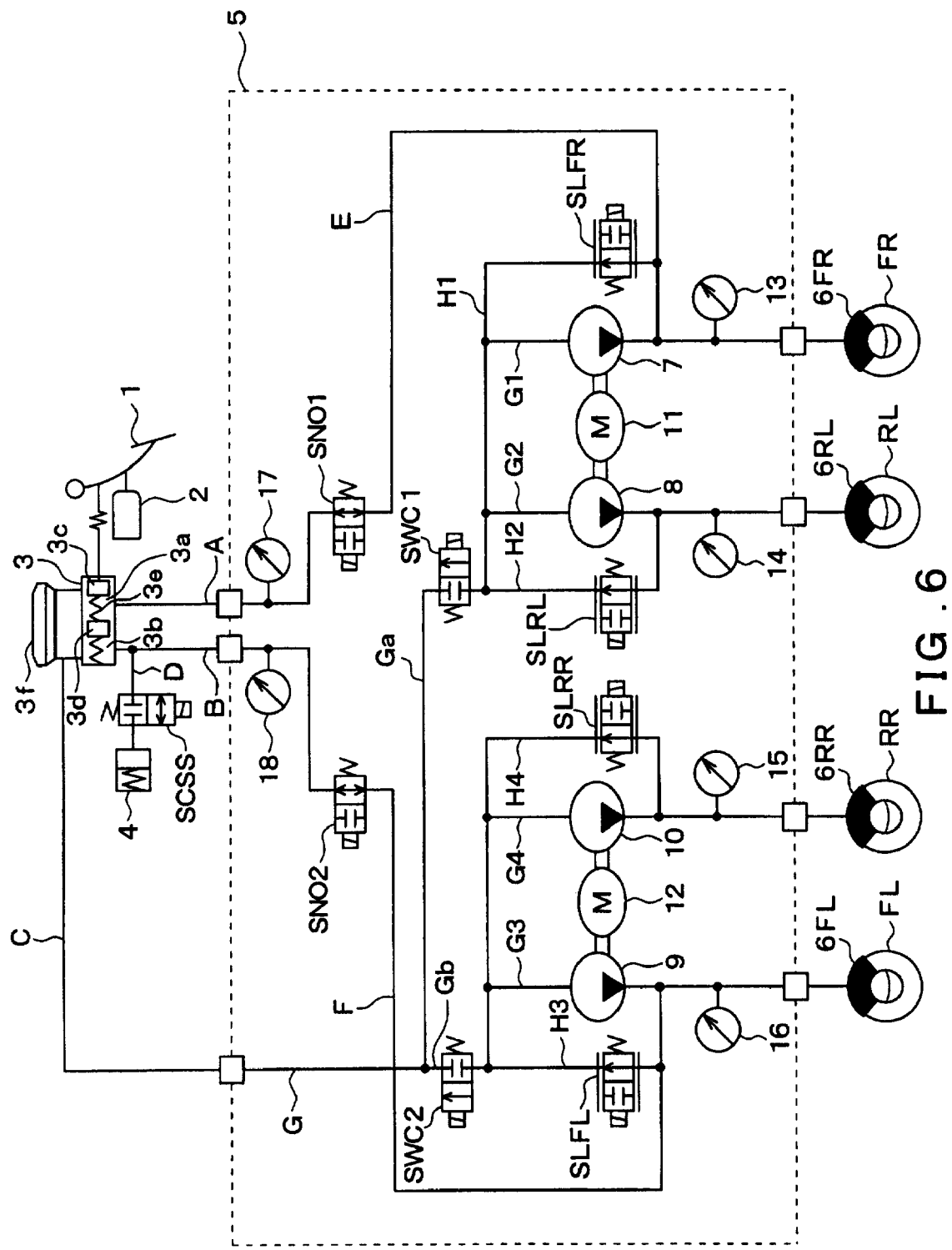
FIG. 6 is a diagram showing a hydraulic circuit configuration of a vehicle brake control device according to a second embodiment of the present invention.

FIG. 6 is a diagram showing a hydraulic circuit configuration of a vehicle brake control device according to this embodiment. As shown in FIG. 6, in the vehicle brake control device in this embodiment, the brake conduit G is divided into two brake conduits Ga and Gb. The first normally-closed valve SWC1 is located in the brake conduit Ga (that is, downstream of the dividing point of the conduits Ga and Gb and upstream of the brake conduits H1 and H2). The second normally-closed valve SWC2 is located in the brake conduit Gb (that is, downstream of the dividing point and upstream of the brake conduits H3 and H4).

The vehicle brake control device with the structure described above achieves the same effect as that of the first embodiment, if it calculates the first and second bottom rotational speeds respectively of the motors 11 and 12 achieving the pressure increase rates required on high friction sections of a road, calculates the first and second top rotational speeds respectively of the motors 11 and 12 as the upper limits caused by the unlocking pressure limits, and controls the motors 11 and 12 so that they are rotated in rotational speeds between the bottom rotational speeds and the top rotational speeds.

In this configuration, even if the first normally-closed valve SWC1 is closed when an abnormality occurs, only the portion of the system on the upstream side of the brake conduits H1 and H2 is closed. Therefore, if the M/C pressure is generated in the primary chamber 3a of the M/C 3 because of depressing of a brake pedal 1, the M/C pressure can be transmitted not only to the W/C 6FR for the right front wheel FR, but also to the W/C 6RL for the left rear wheel RL. Likewise, even if the second normally-closed valve SWC2 is closed when an abnormality occurs, only the portion of the system on the upstream side of the brake conduits H3 and H4 is closed. Therefore, if the M/C pressure is generated in the secondary chamber 3b of the M/C 3 because of depressing of the brake pedal 1, the M/C pressure can be transmitted not only to the W/C 6FL for the left front wheel FL, but also to the W/C 6RR for the right rear wheel RR.

Thus, in the vehicle brake control device in this embodiment, it is possible to generate the W/C pressures in the W/Cs 6FR to 6RR for all four wheels FR to RR in the abnormal situation. Better balanced braking forces can therefore be generated.

In this embodiment, check valves 20 and 21, which were shown in the first embodiment, are not provided. However, the first and second normally-closed valves SWC1 and SWC2, which are located upstream of the pumps 7 and 9, can stop the brake fluid so that no drop occurs in the W/C pressures even if the brake fluid leaks from pumps 7 and 9.

Third Embodiment

A third embodiment of the present invention will be described. In this embodiment, a portion of the configuration of the vehicle brake control device is different from the configuration in the second embodiment, but the overall configuration is basically the same as that in the second embodiment, so only the parts which are different from the second embodiment will be described.

Figure 7:
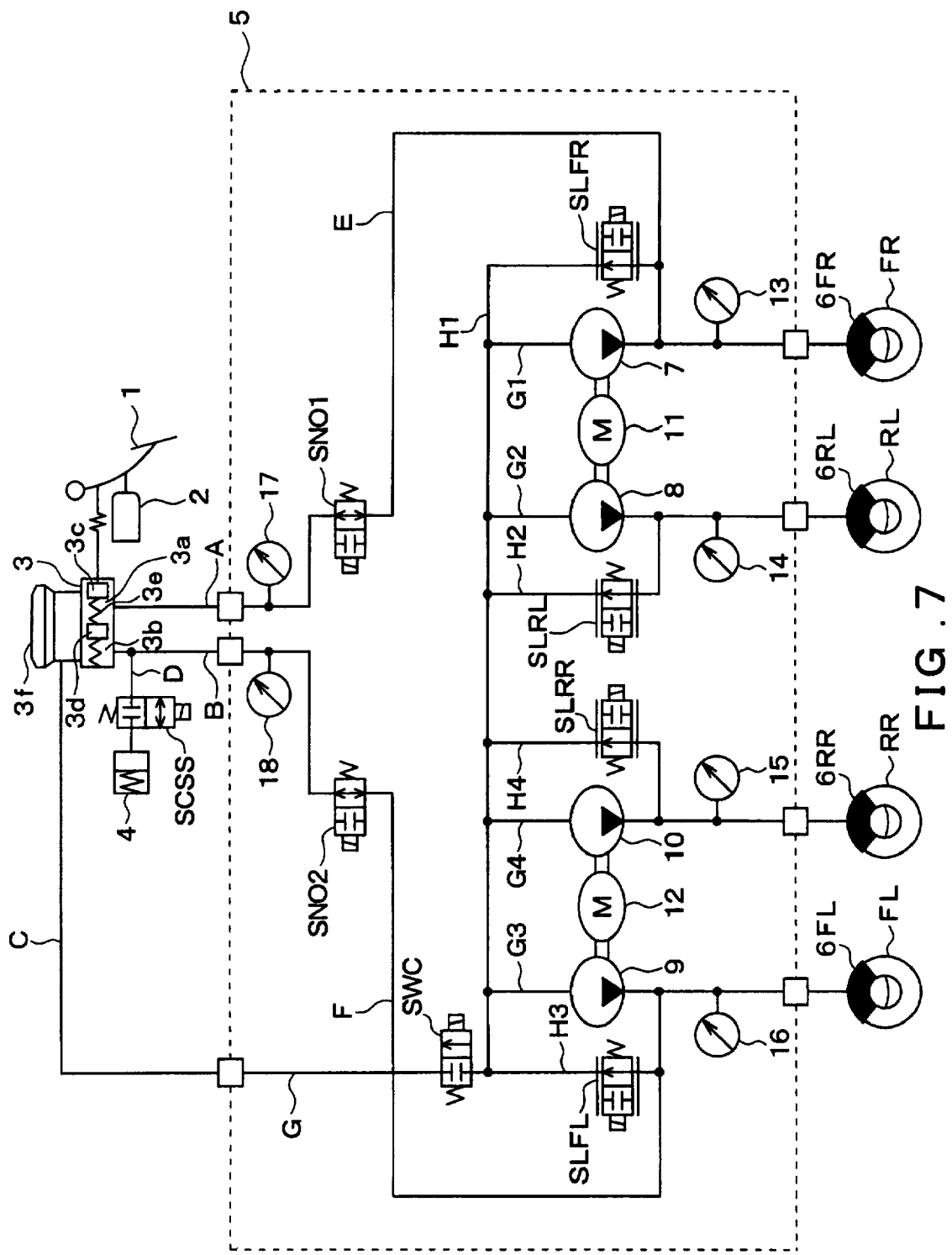
FIG. 7 is a diagram showing a hydraulic circuit configuration of a vehicle brake control device according to a third embodiment of the present invention.

FIG. 7 is a diagram showing a hydraulic circuit configuration of a vehicle brake control device according to this embodiment. As shown in FIG. 7, in the vehicle brake control device in this embodiment, the two conduit systems share a single normally-closed valve SWC, instead of the first and second normally-closed valves SWC1 and SWC2 provided in the first and second embodiments.

The vehicle brake control device with the structure described above achieves the same effect as that of the first and second embodiments, if it calculates the first and second bottom rotational speeds respectively of the motors 11 and 12 achieving the pressure increase rates required on high friction sections of a road, calculates the first and second top rotational speeds respectively of the motors 11 and 12 as the upper limits caused by the unlocking pressure limits, and controls the motors 11 and 12 so that they are rotated in rotational speeds between the bottom rotational speeds and the top rotational speeds.

Even in this configuration, during the normal braking, W/C pressures in the W/Cs 6FR to 6RR for the four wheels FR to RR can be adjusted appropriately, and when an abnormality occurs, the M/C pressure that is generated in the M/C 3 according to depressing of a brake pedal 1 can be transmitted to the W/Cs 6FR to 6RR for the four wheels FR to RR.

In addition, the single normally-closed valve SWC is closed in the abnormal situation. The M/C pressure is accordingly transmitted to all wheels FR to RR in the two conduit systems. Therefore, it is possible to make the system configuration more compact.

In the vehicle brake control device in this embodiment, the way for driving the normally-closed valve SWC is the same as that for driving the first and second normally-closed valves SWC1 and SWC2 in the vehicle brake control device according to the first embodiment, as shown in FIG. 3.

Fourth Embodiment

Hereinafter, a fourth embodiment of the present invention will be described. The present embodiment differs from the first embodiment in that the present embodiment has an additional method to determine the rotational speeds of the first and second motors 11 and 12, and the parts which are different from the first embodiment will be described.

Figure 8:
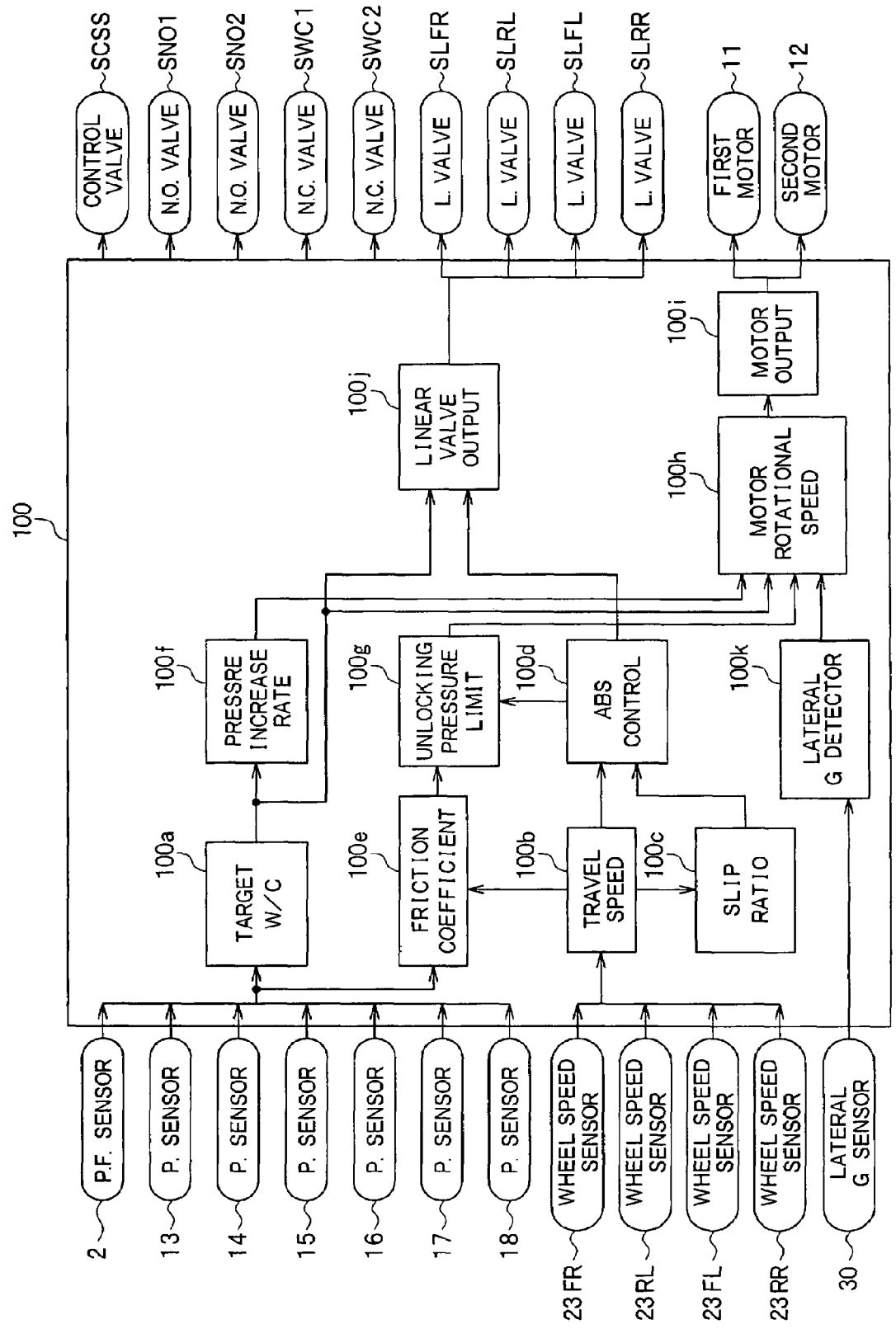
FIG. 8 is a block diagram showing input-output relationships of signals of a brake ECU that controls a control system of the vehicle brake control device according to a fourth embodiment of the present invention.

FIG. 8 shows a structure and an input-output relation of a brake ECU 100 of a vehicle brake control device according to the present embodiment. As shown in the drawing, the brake ECU 100 differs from that of the first embodiment in that the brake ECU 100 of the present embodiment includes a lateral acceleration (hereinafter referred to as a lateral G) sensor 30 which detects the lateral G of the vehicle and outputs a detection signal indicating the detected lateral G. The detection signal from the lateral G sensor 30 is inputted to a lateral G detector 100k. The lateral G detector 100k calculates the lateral G based on the detection signal from the lateral G sensor 30 and outputs the calculated lateral G to the motor rotational speed calculating portion 100h. The motor rotational speed calculating portion 100h calculates the rotational speeds of the first and second motors 11 and 12 based on the detected lateral G.

Figure 9:
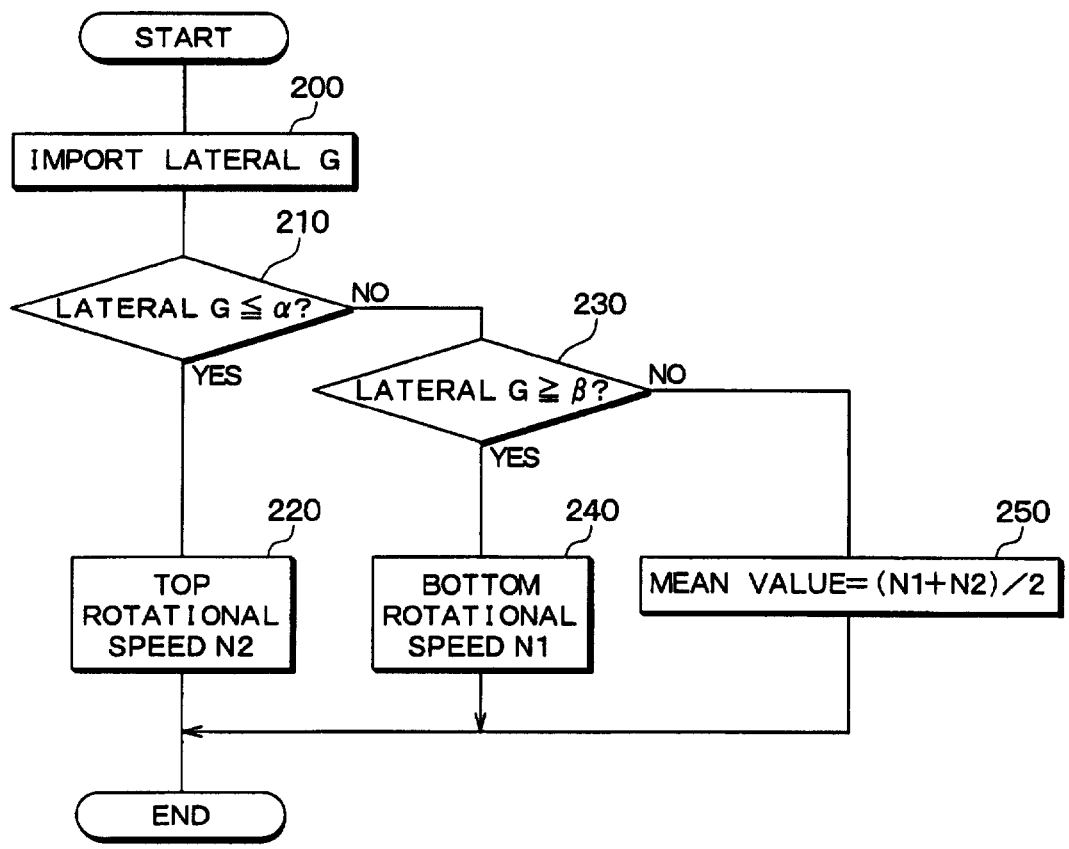
FIG. 9 is a flowchart showing a motor rotational speed determination process.

More specifically, the portion 100h determines, by executing a motor rotational speed determination process described below, the target motor rotational speeds to be used in controlling the first and second motors 11 and 12. The motor rotational speed determination process will be described with reference to a flowchart shown in FIG. 9.

When the portion 100h determines the first bottom rotational speed, second bottom rotational speed, first top rotational speed, and second top rotational speed as described in the first embodiment, it starts the motor rotational speed determination process. At the beginning of the motor rotational speed determination process, the portion 100h executes a lateral G import process at step 200. In the lateral G import process, the portion 100h obtains the result of the calculation made by the lateral G detector 100k. Subsequently at the step 210, the portion 100h makes a determination as to whether the imported lateral G is smaller than a first threshold α. The first threshold α is a reference acceleration to determine whether the imported lateral G is so small that it can be assumed that the vehicle is in a stable state. In the case that the imported lateral G is smaller than the first threshold α, a degree of stability of the vehicle is high. In this case, the target rotational speeds of the first and second motors 11 and 12 can be set to relatively large values to put importance on making the brake stopping distance smaller.

If the determination at step 210 is affirmative, the portion 100h subsequently executes step 220 to determine the target rotational speeds of the first and second motors 11 and 12 to be equal to the first and second top motor rotational speeds N2, respectively. If the determination at step 210 is negative, the portion 100h subsequently executes step 230 to make a determination as to whether the imported lateral G is larger than a second threshold β. The second threshold is β is larger than the first threshold α and is a reference acceleration to determine whether the imported lateral G is so large that it can be assumed that the vehicle is in an unstable state. In the case that the imported lateral G is larger than the second threshold β, a degree of stability of the vehicle is low. In this case, the target rotational speeds of the first and second motors 11 and 12 can be set to relatively small values to place importance on making the vehicle stable rather than making the brake stopping distance smaller.

If the determination at step 230 is affirmative, the portion 100h subsequently determines at step 240 the target motor rotational speeds of the first and second motors 11 and 12 to be equal to the first and second bottom motor rotational speeds N1, respectively. If both the determinations at steps 220 and 240 are negative, the portion 100h subsequently determines at step 250 the target motor rotational speeds of the first and second motors 11 and 12 to be equal to the mean (or intermediate) values (N1+N2)/2 of the first and second bottom rotational speeds N1 and the first and second top rotational speeds N2, respectively, since importance of making the brake stopping distance smaller is comparable with importance of making the vehicle stable.

As described above, the vehicle brake control device detects the lateral G of the vehicle, determines stability of the vehicle based on the detected lateral G. The vehicle brake control device then determines the target rotational speeds of the first and second motors 11 and 12 to be relatively large values to shorten the brake stopping distance of the vehicle when the degree of the determined stability is high. The vehicle brake control device determines the target rotational speeds of the first and second motors 11 and 12 to be relatively small values to improve the stability of the vehicle when the degree of the determined stability is small.

In the above description, the first threshold α and the second threshold β have different values. However, the first threshold α and the second threshold β may have a common value. In this case, the portion 100h may determine the target rotational speeds of the first and second motors 11 and 12 to be relatively large values when the lateral G is smaller than the common value. In addition, the portion 100h may determine the target rotational speeds of the first and second motors 11 and 12 to be relatively small values when the lateral G is larger than the common value.

Other Embodiment

The vehicle brake control device shown in FIG. 1 is merely an example of the present invention. The vehicle brake control device of the present invention is not limited by that shown in FIG. 1, but may be modified in a variety of ways.

For example, in the first embodiment, examples were explained of vehicle brake control devices applied to a vehicle in which conduit systems include hydraulic circuits in an X conduit arrangement, with a conduit system connecting the left front and right rear wheels and another conduit system connecting the right front and left rear wheels. However, the present invention may also be applied to other systems, such as a front-and-rear conduit arrangement or the like.

In the above embodiments, the brake fluid is supplied to both the first conduit system and the second conduit system through the brake conduit C which is the only conduit connected with the master reservoir 3f. However, supplemental brake conduit other than the brake conduit C connected may be provided. In this case, the brake fluid may be supplied to the first conduit system through the brake conduit C and to the second conduit system through the supplemental brake conduit.

In the above embodiments, the M/C 3 is connected with the first conduit system and the second conduit system in case of the abnormal situation in which the first to four pumps 7 to 10 cannot generate pressure. In addition, in the above embodiments, the brake fluid is supplied from the master reservoir 3f during the normal braking. However, the operation is merely an example of the present invention. The M/C 3 may be separated from the first conduit system and the second conduit system. The M/C 3 may be disused. The brake fluid may be supplied not from the master reservoir 3f but from another reservoir which can store the brake fluid.

Figure 10:
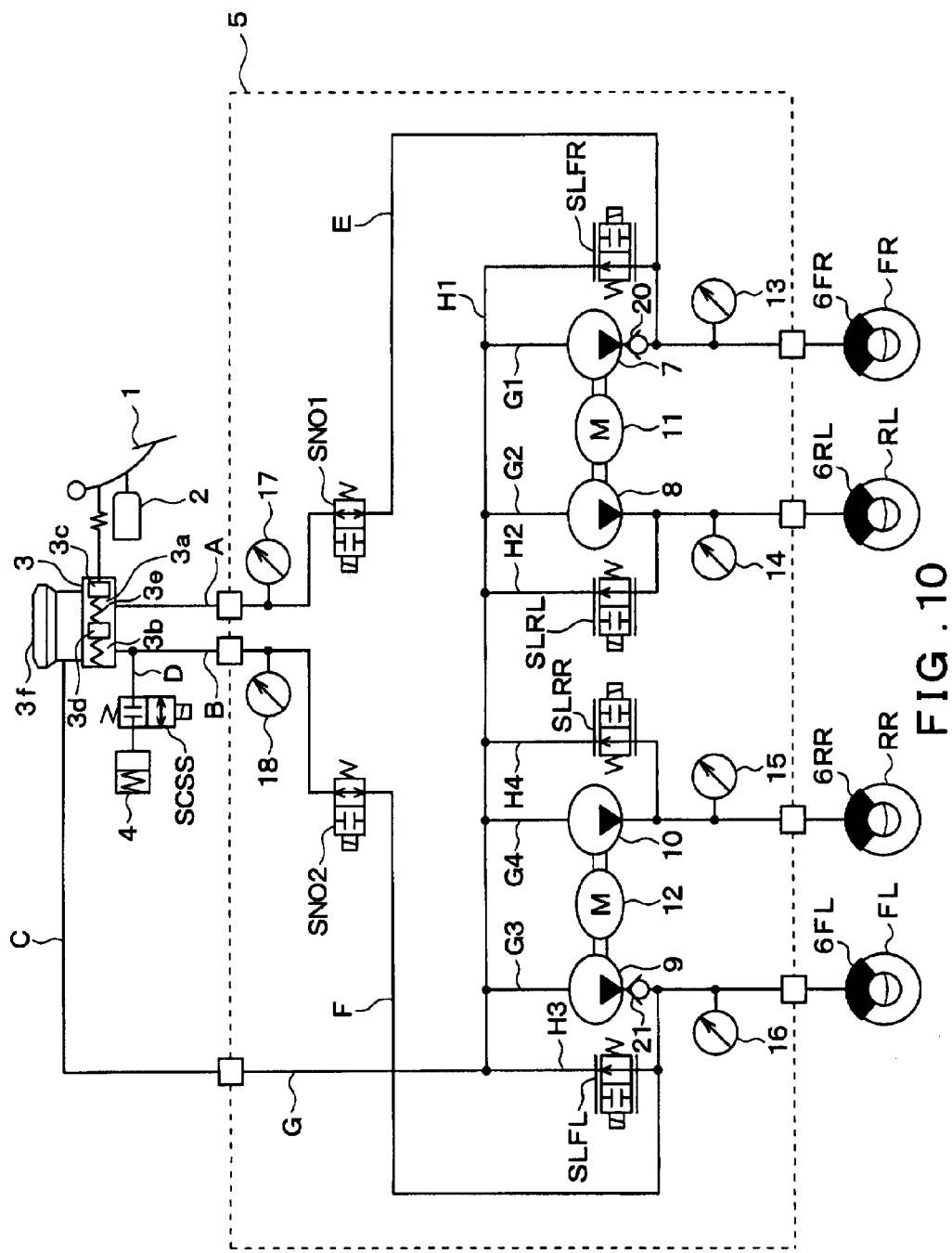
FIG. 10 is a diagram showing a hydraulic circuit configuration of a vehicle brake control device according to another embodiment of the present invention.

Also, in the preceding embodiments, even if the first to fourth linear valves SLFL to SLRR do not operate, the M/C pressure that is generated mechanically based on depressing of the brake pedal 1 is transmitted to the W/Cs 6FL, 6FR and the like in consideration of the need for fail-safe operation. However, if a location where an abnormality occurs is somewhere other than the first to fourth linear valves SLFL to SLRR, the first to fourth linear valves SLFL to SLRR can operate. So if electric power can be supplied to the first to fourth linear valves SLFL to SLRR so that the brake conduits H1 to H4 are closed (or, so that a pressure difference between an upstream and an downstream of each of the brake conduits H1 to H4 is maximized), it would be possible to transmit the M/C pressure to the W/Cs 6FL, 6FR and the like in the same manner as described above. Therefore, it is not necessarily the case that the first and second normally-closed valves SWC1, SWC2 or the single normally-closed valve SWC must be provided. As shown in the hydraulic circuit configuration shown in FIG. 10, a structure may also be used that is not provided with the first and second normally-closed valves SWC1, SWC2 or with the single normally-closed valve SWC.

However, in the sense that all fail-safe operations must be able to be executed mechanically, the first and second normally-closed valves SWC1 and SWC2 and the single normally-closed valve SWC are important.

Figure 11:
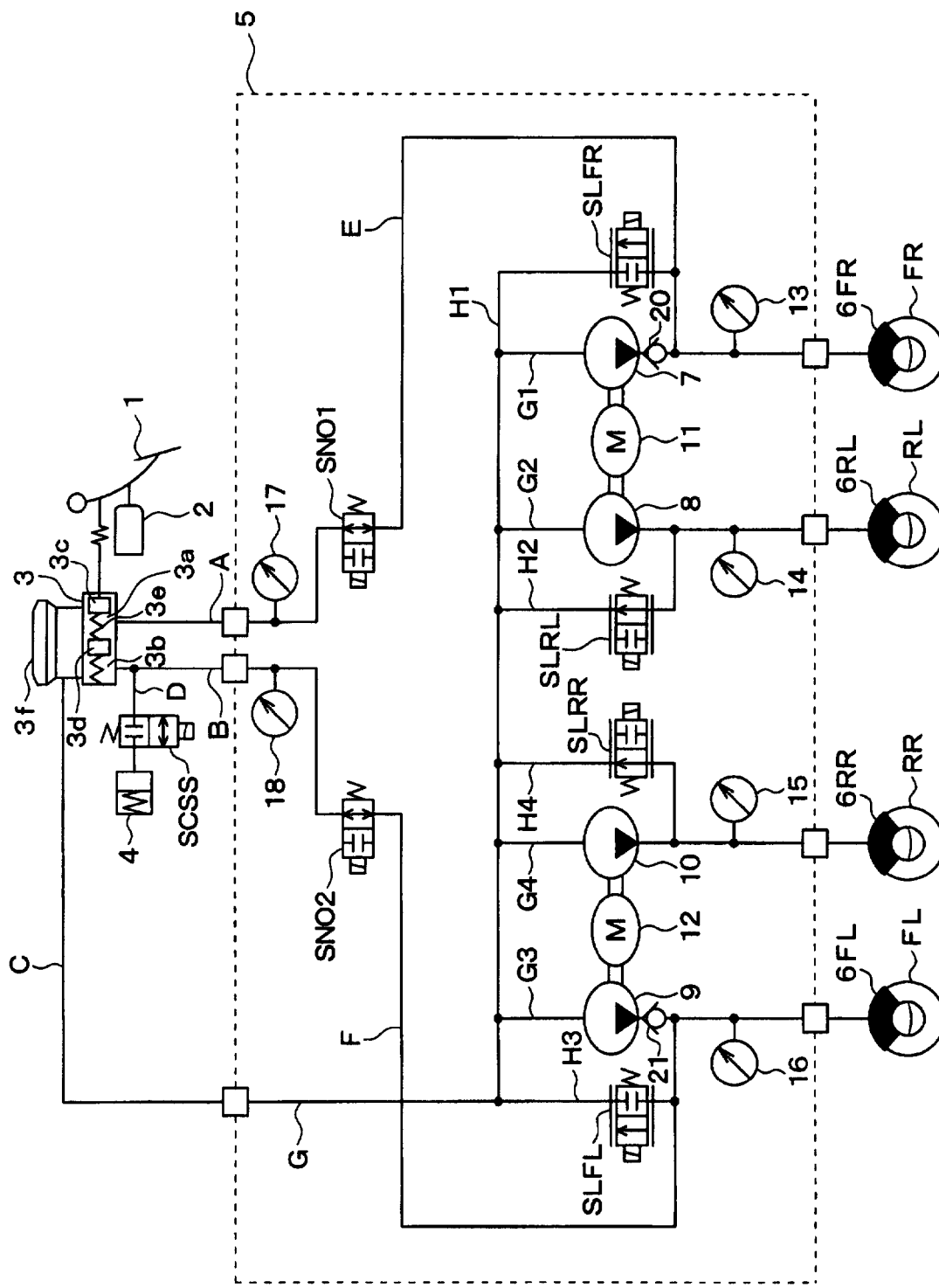
FIG. 11 is a diagram showing a hydraulic circuit configuration of a vehicle brake control device according to still another embodiment of the present invention.

Therefore, as shown in the hydraulic circuit configuration shown in FIG. 11, it is more preferable if the first linear valve SLFR and the third linear valve SLFL are configured as normally-closed linear valves, because the fail-safe operation can be executed mechanically. Of course, the second linear valve SLRL and the fourth linear valve SLRR may also be configured as normally-closed linear valves.

In the fourth embodiment, the degree of stability is determined based on the lateral G of the vehicle. However, a parameter to be used to determine the degree of the stability can be any of the yaw rate of the vehicle, the speed of the vehicle, the speed of the body of the vehicle, and the steering angle of the vehicle.

Figure 12:
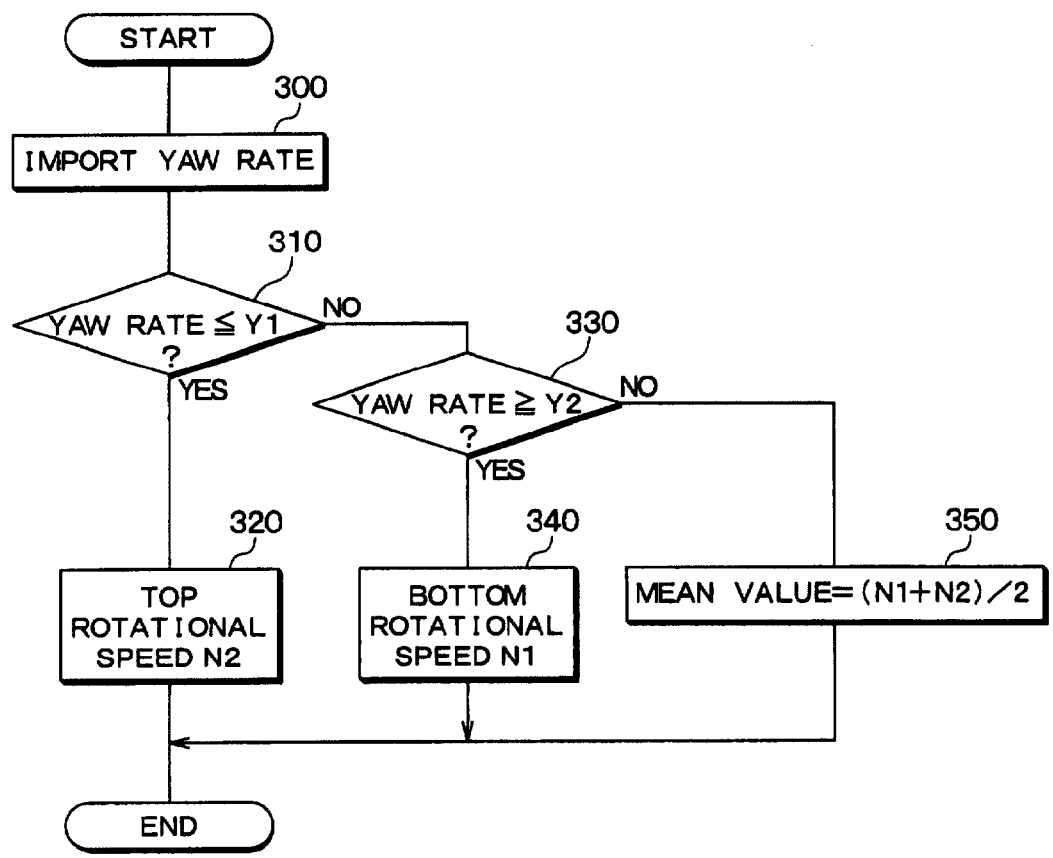
FIG. 12 is a flowchart showing another example of a motor rotational speed determination process.

For example, as shown in FIG. 12, the portion 100h may import at step 300 the yaw rate Y in place of the lateral G. In this case, when the imported yaw rate Y is smaller than a first threshold Y1 (step 310), that is, when the degree of stability is high, the portion 100h may determine at step 320 the target rotational speeds of the motors to be the first and second top rotational speeds N2. In contrast, when the imported yaw rate Y is larger than a second threshold Y2 (step 330) which is larger than or equal to the first threshold Y1, that is, when the degree of stability is small, the portion 100h may determine at step 340 the target rotational speeds of the motors to be the first and second bottom rotational speeds N1. When the imported yaw rate Y is between the first threshold Y1 and the second threshold Y2 (step 330), the portion 100h may determine at step 350 the target rotational speeds of the motors to be the mean (or intermediate) value (N1+N2)/2 of the top and bottom rotational speeds N1 and N2.

Figure 13:
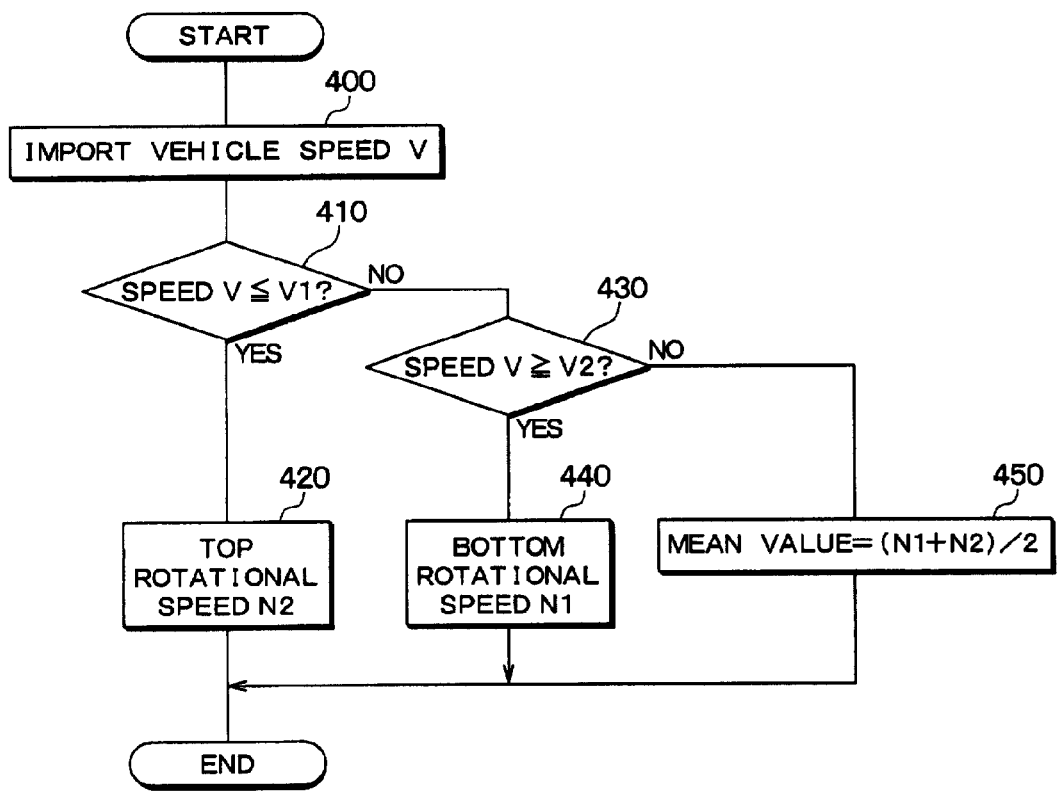
FIG. 13 is a flowchart showing still another example of a motor rotational speed determination process.

As shown in FIG. 13, the portion 100h may import at step 400 the speed V of the vehicle (or the speed of the body of the vehicle). In this case, when the imported speed V is smaller than a first threshold V1 (step 410), that is, when the degree of stability is high, the portion 100h may determine at step 420 the target rotational speeds of the motors to be the first and second top rotational speeds N2. In contrast, when the imported speed V is larger than a second threshold V2 (step 430) which is larger than or equal to the first threshold V1, that is, when the degree of stability is small, the portion 100h may determine at step 440 the target rotational speeds of the motors to be the first and second bottom rotational speeds N1. When the imported speed V is between the first threshold V1 and the second threshold V2 (step 430), the portion 100h may determine at step 450 the target rotational speeds of the motors to be the mean (or intermediate) value (N1+N2)/2 of the bottom and top rotational speeds N1 and N2.

Figure 14:
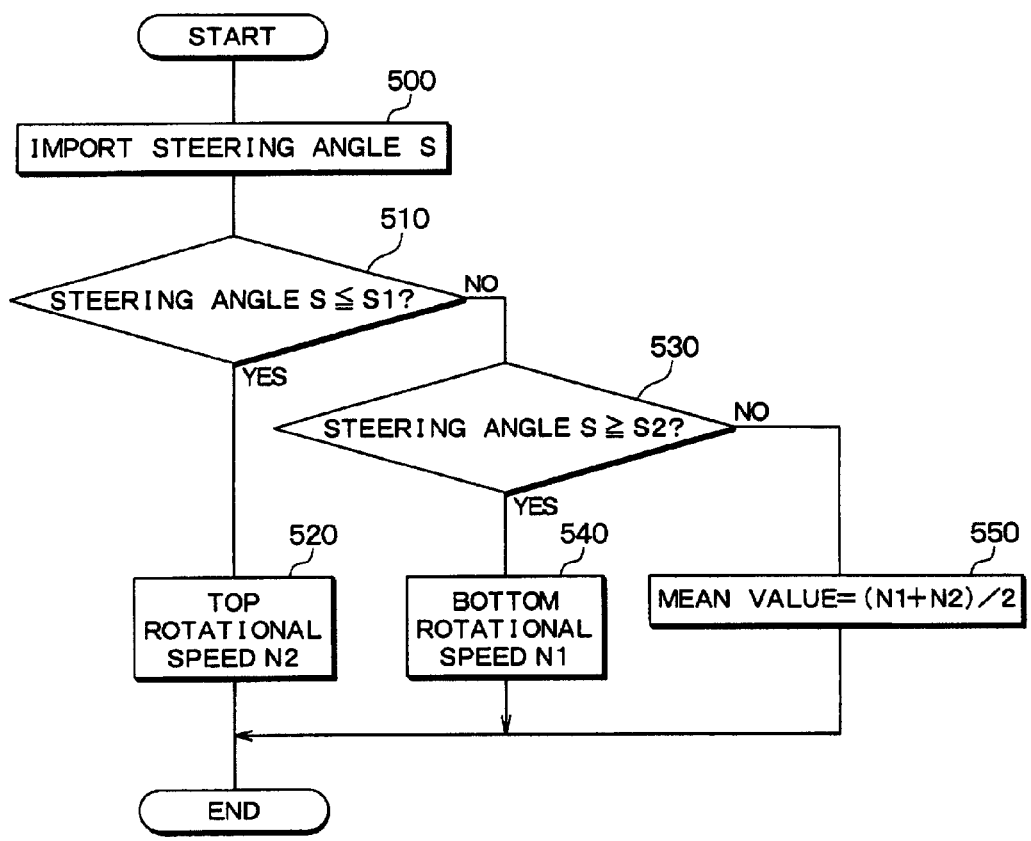
FIG. 14 is a flowchart showing more another example of a motor rotational speed determination process.

As shown in FIG. 14, the portion 100h may import at step 500 the steering angle S of the vehicle. In this case, when the imported steering angle S is smaller than a first threshold S1 (step 510), that is, when the degree of stability is high, the portion 100h may determine at step 520 the target rotational speeds of the motors to be the first and second top rotational speeds N2. In contrast, when the imported steering angle S is larger than a second threshold S2 (step 530) which is larger than or equal to the first threshold S1, that is, when the degree of stability is small, the portion 100h may determine at step 540 the target rotational speeds of the motors to be the first and second bottom rotational speeds N1. When the imported steering angle S is between the first threshold S1 and the second threshold S2 (step 530), the portion 100h may determine at step 550 the target rotational speeds of the motors to be the mean (or intermediate) value (N1+N2)/2 of the bottom and top rotational speeds N1 and N2. The vehicle moves in accordance with the operation to the steering of the vehicle after the operation is performed by the driver. The vehicle brake control device can therefore shorten braking stop distance while maintaining the stability of the vehicle in a better manner by using the steering angle as the parameter for determining the degree of the stability of the vehicle.

The vehicle brake control device may use multiple kinds of parameters for determining the degree of stability of the vehicle at the same time as well as use a single kind of parameter for determining the degree of stability of the vehicle at the same time. In the case that the multiple kinds of parameters are used, the target rotational speeds of the first and second motors 11 and 12 can be determined to be the second rotational speed only when all of the used parameters indicate that the degree of stability of the vehicle is high. Alternatively, the target rotational speeds of the first and second motors 11 and 12 can be determined to be the second rotational speed when the group of the used parameters indicates by means of the majority decision logic that the degree of stability of the vehicle is high.

The yaw rate can be detected by using a yaw rate sensor installed in the vehicle. The yaw rate can also be calculated based on the lateral acceleration or the speed of the vehicle (or the speed of the body of the vehicle). The speed of the vehicle (or the speed of the body of the vehicle) may be calculated by the travel speed calculating portion 100b or detected by using a vehicle speed sensor installed in the vehicle. The steering angle can be detected by using a steering angle sensor installed in the vehicle.

In the above embodiments, the brake pedal 1 serves as an example of a brake operating member. However, a brake lever and the like may serve as and example of the brake operating member.

What is claimed is:

1. A vehicle brake control device, comprising:
   a brake operating member to be operated by a driver;
   an operation amount sensor for detecting an operation amount of the brake operating member;
   a first and a second front wheel cylinder, which are respectively installed to two front wheels;
   a first and a second rear wheel cylinder, which are respectively installed to two rear wheels;
   a reservoir for storing brake fluid;
   a main conduit for connecting the first and second front wheel cylinders and the first and second rear wheel cylinders with the reservoir, the main conduit branching into four sections which are respectively connected with the first and second front wheel cylinders and the first and second rear wheel cylinders;
   a first pump located in a first one of the four sections, the first pump for pressurizing a first one of the first front wheel cylinder, the second front wheel cylinder, the first rear wheel cylinder, and the second rear wheel cylinder by drawing in and discharging the brake fluid stored in the reservoir;
   a second pump located in a second one of the four sections, the second pump for pressurizing a second one of the first front wheel cylinder, the second front wheel cylinder, the first rear wheel cylinder, and the second rear wheel cylinder by drawing in and discharging the brake fluid stored in the reservoir;
   a third pump located in a third one of the four sections, the third pump for pressurizing a third one of the first front wheel cylinder, the second front wheel cylinder, the first rear wheel cylinder, and the second rear wheel cylinder by drawing in and discharging the brake fluid stored in the reservoir;
   a fourth pump located in a fourth one of the four sections, the fourth pump for pressurizing a fourth one of the first front wheel cylinder, the second front wheel cylinder, the first rear wheel cylinder, and the second rear wheel cylinder by drawing in and discharging the brake fluid stored in the reservoir;
   a first motor for driving the first and second pumps which are provided to a first conduit system of the main conduit and pressurize the first conduit system;

a second motor for driving the third and fourth pumps which are provided to a second conduit system of the main conduit and pressurize the second conduit system;

first to fourth adjustment conduits, which are located respectively in parallel with the first to fourth pumps and return the brake fluid to the reservoir;

first to fourth linear valves, which are respectively located in the first to fourth adjustment conduits; and control means for controlling, based on a detection signal from the operation amount sensor, the first to fourth linear valves, the first motor, and the second motor, wherein the control means includes:

a first calculating portion for calculating target wheel cylinder pressures corresponding to the operation amount detected by the operation amount sensor when the operation amount sensor detects that the brake operating member is operated;

a second calculating portion for calculating slip ratios of the front wheels and the rear wheels;

an ABS control portion for executing an ABS control based on the slip ratios calculated by the second calculating portion;

a third calculating portion for calculating pressure increase rates of the wheel cylinder pressures based on the target wheel cylinder pressures calculated by the first calculating portion;

a fourth calculating portion for estimating friction coefficients of sections of the road on which the front wheels and the rear wheels are located, respectively;

a fifth calculation portion for calculating unlocking pressure limits for the front wheel cylinders and the rear wheel cylinders based on the estimated friction coefficients;

a sixth calculation portion for calculating target rotational speeds of the first and second motors so that the target rotational speed of the first motor is within a range from first one of first rotational speeds to first one of second rotational speeds and the target rotational speed of the second motor is within a range from second one of the first rotational speeds to second one of the second rotational speeds, wherein the first rotational speeds correspond respectively to the pressure increase rates calculated by the third calculating portion and the second rotational speeds correspond respectively to the unlocking pressure limits calculated by the fifth calculation portion; and an adjusting portion for adjusting current values of currents to be supplied to the first and second motors based on the target rotational speeds of the first and second motors calculated by the sixth calculation portion.

2. The vehicle brake control device according to claim 1, wherein the sixth calculation portion:

calculates each of discharge amounts Q1 of brake fluid discharged by the first to fourth pumps by using the following equation:

$$Q1 = k \times \Delta P^{1/2},$$

wherein the value $\Delta P$ is one of the unlocking pressure limits for one of the first to fourth pumps corresponding to the discharge amount Q1 and the coefficient k depends on a diameter of a orifice of the pump corresponding to the discharge amount Q1; and determines the second rotational speeds respectively to be the discharge amounts Q1 divided respectively by amounts of brake fluid discharged by the first to fourth pumps in a 360-degree rotation.

3. The vehicle brake control device according to claim 1, further comprising a detecting means for detecting a lateral acceleration of a vehicle, wherein the sixth calculating portion determines, respectively, the target rotational speed of the first or second motor to be equal to the first or second one of the second rotational speeds when the detected lateral acceleration is equal to or smaller than a first threshold and to be equal to the first or second one of the first rotational speeds when the detected lateral acceleration is equal to or larger than a second threshold which is equal to or larger than the first threshold.

4. The vehicle brake control device according to claim 1, further comprising a detecting means for detecting a travel speed of a vehicle, wherein the sixth calculating portion determines, respectively, the target rotational speed of the first or second motor to be equal to the first or second one of the second rotational speeds when the detected travel speed is equal to or smaller than a first threshold and to be equal to the first or second one of the first rotational speeds when the detected travel speed is equal to or larger than a second threshold which is equal to or larger than the first threshold.

5. The vehicle brake control device according to claim 1, further comprising a detecting means for detecting a yaw rate of a vehicle, wherein the sixth calculating portion determines, respectively, the target rotational speed of the first or second motor to be equal to the first or second one of the second rotational speeds when the detected yaw rate is equal to or smaller than a first threshold and to be equal to the first or second one of the first rotational speeds when the detected yaw rate is equal to or larger than a second threshold which is equal to or larger than the first threshold.

6. The vehicle brake control device according to claim 1, further comprising a detecting means for detecting a steering angle of a vehicle, wherein the sixth calculating portion determines, respectively, the target rotational speed of the first or second motor to be equal to the first or second one of the second rotational speeds when the detected steering angle is equal to or smaller than a first threshold and to be equal to the first or second one of the first rotational speeds when the detected steering angle is equal to or larger than a second threshold which is equal to or larger than the first threshold.

7. A vehicle brake control device, comprising:

a brake operating member to be operated by a driver;

an operation amount sensor for detecting an operation amount of the brake operating member;

a first and a second left wheel cylinder, which are respectively installed to two left wheels;

a first and a second right wheel cylinder, which are respectively installed to two right wheels;

a reservoir for storing brake fluid;

a main conduit for connecting the first and second left wheel cylinders and the first and second right wheel cylinders with the reservoir, the main conduit branching into four sections which are respectively connected with the first and second left wheel cylinders and the first and second right wheel cylinders;

a first pump located in a first one of the four sections, the first pump for pressurizing the first right wheel cylinder by drawing in and discharging the brake fluid stored in the reservoir;

a second pump located in a second one of the four sections, the second pump for pressurizing the first left wheel cylinder by drawing in and discharging the brake fluid stored in the reservoir;

a third pump located in a third one of the four sections, the third pump for pressurizing the second left wheel cylinder by drawing in and discharging the brake fluid stored in the reservoir;

a fourth pump located in a fourth one of the four sections, the fourth pump for pressurizing the second right wheel cylinder by drawing in and discharging the brake fluid stored in the reservoir;

a first motor for driving the first and second pumps which are provided to a first conduit system of the main conduit and pressurize the first conduit system;

a second motor for driving the third and fourth pumps which are provided to a second conduit system of the main conduit and pressurize the second conduit system;

first to fourth adjustment conduits, which are located respectively in parallel with the first to fourth pumps and return the brake fluid to the reservoir;

first to fourth linear valves, which are respectively located in the first to fourth adjustment conduits; and control means for controlling, based on a detection signal from the operation amount sensor, the first to fourth linear valves, the first motor, and the second motor, wherein the control means includes:

a first calculating portion for calculating target wheel cylinder pressures corresponding to the operation amount detected by the operation amount sensor when the operation amount sensor detects that the brake operating member is operated;

a second calculating portion for calculating slip ratios of the left wheels and the right wheels;

an ABS control portion for executing an ABS control based on the slip ratios calculated by the second calculating portion;

a third calculating portion for calculating pressure increase rates of the wheel cylinder pressures based on the target wheel cylinder pressures calculated by the first calculating portion;

a fourth calculating portion for estimating friction coefficients of sections of the road on which the left wheels and the right wheels are located, respectively;

a fifth calculation portion for calculating unlocking pressure limits for the left wheel cylinders and the right wheel cylinders based on the estimated friction coefficients;

a sixth calculation portion for calculating target rotational speeds of the first and second motors so that the target rotational speed of the first motor is within a range from a first bottom rotational speed to a first top rotational speed and the target rotational speed of the second motor is within a range from a second bottom rotational speed to a second top rotational speed, wherein the first bottom rotational speed is a larger one of two rotational speeds corresponding respectively to the calculated pressure increase rates of the first right and first left wheel cylinders, the first top rotational speed is a smaller one of two rotational speeds corresponding respectively to the calculated unlocking pressure limits for the first right and first left wheel cylinders, the second bottom rotational speed is a larger one of two rotational speeds corresponding respectively to the calculated pressure increase rates of the second right and second left wheel cylinders, and the second top rotational speed is a smaller one of two rotational speeds corresponding respectively to the calculated unlocking pressure limits for the second right and second left wheel cylinders; and an adjusting portion for adjusting current values of currents to be supplied to the first and second motors, based on the target rotational speeds of the first and second motors calculated by the sixth calculation portion.

\* \* \* \* \*